US008379153B2

(12) United States Patent
Isobe

(10) Patent No.: US 8,379,153 B2
(45) Date of Patent: Feb. 19, 2013

(54) VIDEO SIGNAL PROCESSING DEVICE AND A DISPLAY APPARATUS

(75) Inventor: Toshinobu Isobe, Chiba (JP)

(73) Assignee: Sony Corporation, Tokyo (JP)

( * ) Notice: Subject to any disclaimer, the term of this patent is extended or adjusted under 35 U.S.C. 154(b) by 388 days.

(21) Appl. No.: 12/730,708

(22) Filed: Mar. 24, 2010

(65) Prior Publication Data
US 2010/0259685 A1 Oct. 14, 2010

(30) Foreign Application Priority Data

Apr. 10, 2009 (JP) ................................ P2009-096358
Aug. 28, 2009 (JP) ................................ P2009-198677

(51) Int. Cl.
*H04N 9/68* (2006.01)
*H04N 1/58* (2006.01)
(52) U.S. Cl. ........ 348/645; 348/703; 348/255; 348/659; 348/687; 348/625; 382/274; 345/604; 358/520
(58) Field of Classification Search .................. 348/645, 348/659, 661, 687, 703, 255, 624, 625, 627; 345/604, 600; 382/274, 167; 358/520, 532
See application file for complete search history.

(56) References Cited

U.S. PATENT DOCUMENTS 6,028,646 A * 2/2000 Jeong et al. .................... 348/645

FOREIGN PATENT DOCUMENTS

| EP | 1051044 | 11/2000 |
|---|---|---|
| JP | 61-295792 | 12/1986 |
| KR | 10-2008-0018690 | 2/2008 |

OTHER PUBLICATIONS

European Search Report issued Jun. 20, 2011, from the European Patent Office in corresponding European Patent application No. 10 25 0468.

* cited by examiner

*Primary Examiner* — Jefferey Harold
*Assistant Examiner* — Jean W Desir
(74) *Attorney, Agent, or Firm* — Finnegan, Henderson, Farabow, Garrett & Dunner, L.L.P.

(57) ABSTRACT

In the video signal processing device, the first color space converting section performs color space conversion on an input video signal, to generate a converted video signal configured of H, S and V signals. The first high-frequency separating section separates a high-frequency component from the luminance signal in the input video signal, to generate high-frequency luminance signals. The combining section performs a combining process based on the V signal or the S signal or both, and the high-frequency luminance signal, to generate a combined V signal or a combined S signal or both. The second color space converting section performs color space conversion on a video signal, configured of the H signal, the S signal or the combined S signal, and the V signal or the combined V signal, to generate an output video signal defined in RGB color space.

11 Claims, 27 Drawing Sheets

FIRST COMPARATIVE EXAMPLE (S=0%)

FIRST COMPARATIVE EXAMPLE (S=100%)

FIG. 13 FIRST MODIFIED EXAMPLE (S=0%)

FIG. 14 FIRST MODIFIED EXAMPLE (S=100%)

FIG. 20 SECOND COMPARATIVE EXAMPLE

FIG. 21 THIRD MODIFIED EXAMPLE (3)

SEVENTH MODIFIED EXAMPLE

VIDEO SIGNAL PROCESSING DEVICE AND A DISPLAY APPARATUS

BACKGROUND OF THE INVENTION

1. Field of the Invention

The present invention relates to a video signal processing device that performs a process for improving sharpness of a color image, and a display apparatus including the same.

2. Description of the Related Art

A sharpness improvement circuit that performs a process for improving sharpness of an image in display apparatuses such as televisions has been known (for example, see Japanese Patent Application Publication No. S61-295792).

SUMMARY OF THE INVENTION

In the sharpness improvement circuit in the past, color space conversion is initially performed in a matrix circuit for RGB signals (signals defiend in RGB color space) which are configured of each one of the signals, i.e., inputted R (red) signal, G (green) signal, and B (blue) signal, thereby generating YCbCr signals. The YCbCr signals are configured of each one of the signals, i.e., luminance (Y) signal and color difference (Cb, Cr) signals. Next, a high-frequency component is separated from the generated luminance signal, whereby a high-frequency luminance signal is generated, and then predetermined gain control is performed for the high-frequency luminance signal. The color conversion corresponding to the inverse characteristic of the above-described matrix circuit is then performed for a video signal which is configured of a combined signal (combined luminance signal) in which the original luminance signal and the high-frequency luminance signal after the gain control are combined, and the original Cb, Cr signal, whereby RGB signals, which are output signals, are generated.

However, in the sharpness improvement method in the past as discussed above, due to the arrangement in which the improvement process for image sharpness is performed by combining a luminance signal that is based on RGB signals, i.e., output signals, with a high-frequency luminance signal, there have been the following problems.

That is, first of all, it has been a problem that in the RGB signals, i.e., the output signals after color space conversion, the reduction in saturation occurs at the portion where the sharpness is improved (high-frequency component area).

Further, it has been a problem that in output signals after the color space conversion, the sharpness improvement effect reduces depending on the magnitude of the hue or saturation in the input signals (RGB signals). That is, in the past method in which the high-frequency luminance signal is combined, since the original luminance signal level varies because of the hue and the saturation in relation to a matrix ratio, the level of the luminance signal becomes smaller as the hue or saturation increases, resulting in the reduction in the sharpness improvement effect.

As discussed above, in the sharpness improvement method in the past, since the sharpness improvement effect of an image in output signals is not satisfactory, the realization of a method for appropriately improving image sharpness has been awaited.

It is desirable to provide a video signal processing device and a display apparatus, capable of further appropriately improving image sharpness.

A video signal processing device according to an embodiment of the present invention includes: a first color space converting section performing color space conversion on an input video signal, thereby generating a converted video signal configured of a hue signal (H), a saturation signal (S) and a value signal (V) defined in HSV color space; a first high-frequency separating section separating a high-frequency component from a luminance signal (Y) which is directly or indirectly obtained from the input video signal, thereby generating one or more high-frequency luminance signals; a combining section performing a combining process based on either the value signal or the saturation signal, or both thereof, and the high-frequency luminance signal, thereby generating either a combined value signal or a combined saturation signal, or both thereof; and a second color space converting section performing color space conversion on a video signal, which is configured of the hue signal, the saturation signal or the combined saturation signal, and the value signal or the combined value signal, the video signal including either the combined saturation signal or the combined value signal, or both thereof, thereby generating an output video signal defined in RGB color space.

A display apparatus according to an embodiment of the present invention includes: the above-described video signal processing device according to the embodiment of the present invention; and a display section displaying an image based on the output video signal generated by the video signal processing device.

In the video signal processing device and the display apparatus according to the embodiment of the present invention, the color space conversion is performed based on the input video signal, thereby the converted video signal is generated. Further, the high-frequency component is separated from the luminance signal which is directly or indirectly obtained from the input video signal, thereby one or more high-frequency luminance signals is generated. Then, the combining process is performed based on either the value signal or the saturation signal, or both thereof, and the high-frequency luminance signal, thereby either the combined value signal or the combined saturation signal, or both thereof is generated. Thereafter, color space conversion is performed for a video signal, which is configured of the hue signal, the saturation signal or the combined saturation signal, and the value signal or the combined value signal, and which includes either the combined saturation signal or the combined value signal, or both thereof, thereby the output video signal is generated. That is, by combining either the value signal or the saturation signal, or both thereof based on the input video signal with the high-frequency luminance signal based on the input video signal, an image sharpness improvement process is performed. With this arrangement, unlike the related art in which an image sharpness improvement process is performed by combining a luminance signal based on an input video signal with a high-frequency luminance signal, it is possible to avoid, in the output video signal after the color space conversion, the reduction in saturation in a portion where sharpness is improved (high-frequency component area) or the reduction in sharpness improvement effect depending on the magnitude of the hue or saturation in input video signal.

Another video signal processing device according to an embodiment of the invention includes: the first color space converting section; a second high-frequency separating section separating a high-frequency component from the value signal to generate a high-frequency value signal; another combining section performing a combining process based on either the value signal or the saturation signal, or both thereof, and the high-frequency value signal, thereby generating either a combined value signal or a combined saturation signal, or both thereof; and a fourth color space converting section performing color space conversion for a video signal which is configured of the hue signal, the saturation signal or the combined saturation signal, and the value signal or the combined value signal, and which includes either the combined saturation signal or the combined value signal, or both thereof, thereby generating an output video signal defined in RGB color space.

In the video signal processing device and the display apparatus according to the embodiment of the present invention, since the image sharpness improvement process is performed by combining either the value signal or the saturation signal, or both thereof, based on the input video signal with the high-frequency luminance signal based on the input video signal, it is possible to avoid, in the output video signal after the color space conversion, the reduction in saturation in the portion where sharpness is improved or the reduction in the sharpness improvement effect depending on the magnitude of the hue or the saturation in input video signal. Accordingly, it is possible to appropriately improve the sharpness of an image.

DETAILED DESCRIPTION OF THE PREFERRED EMBODIMENTS

An embodiment of the invention will be described in detail herein below with reference to the drawings. The description will be made in the following order:

1. Embodiment (Examples in which a V signal and a Yhk (gain control in the high frequency of a luminance) signal are combined.)
2. Modified Examples First Modified Example: (An example in which a V signal and a Vhk (gain control in the high frequency of a value) signal are combined.)

Second Modified Example: (An example in which a V signal and a combined signal of Yhk and Vhk are combined.)

Third Modified Example: (An example in which an S signal and a Yhk signal are combined.)

Fourth Modified Example: (An example in which a V signal and an S signal are respectively combined with a Yhk signal.)

Fifth Modified Example: (An example in which input video signals are YCrCb signals in the embodiment.)

Sixth Modified Example: (An example in which a structure component signal and a texture component signal are a high-frequency luminance signal.)

Seventh Modified Example: (An example in which input video signals are YCrCb signals in the sixth modified example.)

1. EMBODIMENT

[Entire Configuration of Display Apparatus 1]

Figure 1:
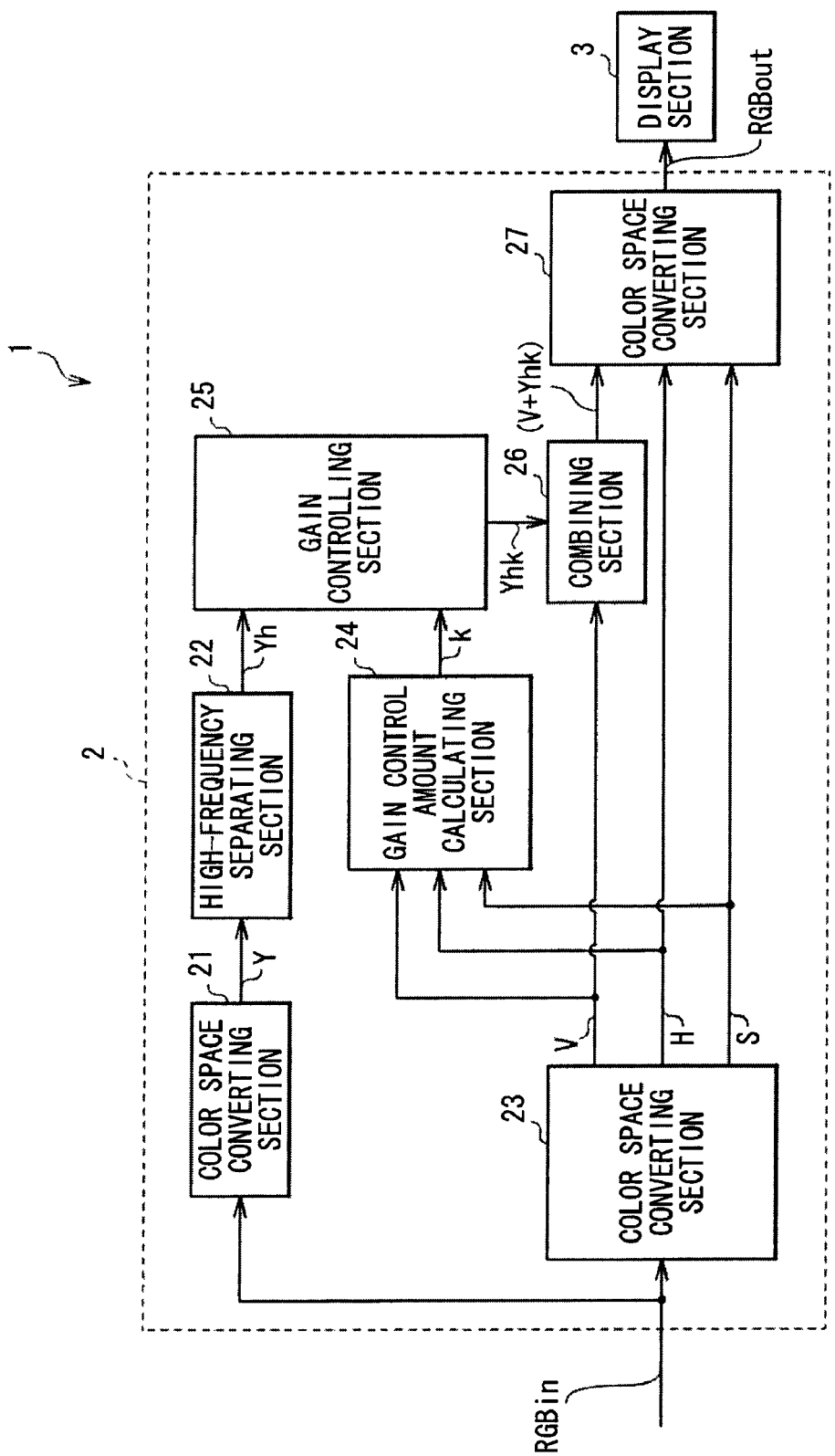
FIG. 1 is a block diagram illustrating the entire configuration of a display apparatus according to an embodiment of the present invention.

FIG. 1 is a block configuration of a display apparatus 1 according to an embodiment of the present invention. The display apparatus 1 includes a video signal processing unit 2 and a display section 3. Incidentally, the video signal processing unit 2 (and video signal processing units 2A to 2G as will hereinafter be described) corresponds to an example of the "video signal processing device" according to an embodiment of the present invention.

[Video Signal Processing Unit 2]

The video signal processing unit 2 includes: color space converting sections 21, 23, and 27; a high frequency separating section 22; a gain control amount calculating section 24; a gain controlling section 25; and a combining section 26.

The color space converting section 21 is configured to perform color space conversion for RGB signals, namely RGBin that are input from the outside, to thereby generate a luminance signal Y and is configured by, e.g., a matrix circuit. Specifically, in the case where the RGB signals, namely RGBin are general television signals, coefficients in accordance with standards such as, for example, BT.709 and BT.601, are used when performing color space conversion.

Figure 2:
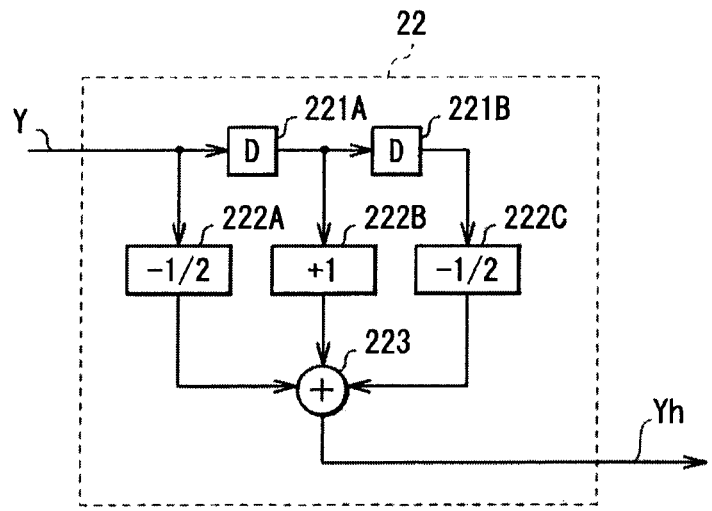
FIG. 2 is a block diagram illustrating an example of a detailed configuration of a high frequency separating section shown in FIG. 1.

The high-frequency separating section 22 is configured to separate a high-frequency component (e.g., 3 MHz or larger) from the luminance signal Y that is output from the color space converting section 21, to thereby generate a high-frequency luminance signal Yh. The high-frequency separating section 22 is configured by, e.g., 1-dimensional or 2-dimensional highpass filter (HPF), etc. As one example of such filters, FIG. 2 shows the one in which a horizontal-three-tap highpass filter circuit is used. That is, the high-frequency separating section 22 in this case includes: two delay parts 221A and 221B; three level control parts 222A, 222B, and 222C; and an addition part 223 which outputs a high-frequency luminance signal Yh.

The color space converting section 23 is configured to perform color space conversion for RGB signals, namely RGBin that are input from the outside, to thereby generate video signals (HSV signals) defined in HSV color space. These HSV signals are signals defined in color space which includes three components, that is, a hue (H), a saturation value (S), and a value (V), and expresses color difference in a manner that the difference is almost the same as that sensed by the eyesight of a human. Specifically, suppose each color signal, R, G, and B indicates a numerical range in which a minimum value is 0.0 and a maximum value is 1.0, the conversion from RGB color space into HSV color space is performed by using, e.g., the following Equations (1) to (6). Here, MAX in the equations represents the maximum value among the values of R, G, and B signals, whereas MIN represents the minimum value among the values of R, G, and B signals. Incidentally, the value of a hue signal H varies in the range between 0.0 and 360.0, and is expressed in terms of the degree of an angle. Three hundred sixty degree is identical to the 0.0 degree. Further, the values of the saturation S and the value signal V vary within the range between 0.0 and 1.0.

$$H = \begin{cases} 60 \times \frac{G-B}{MAX-MIN} + 0, & \text{if } MAX = R \quad (1) \\ 60 \times \frac{B-R}{MAX-MIN} + 120, & \text{if } MAX = G \quad (2) \\ 60 \times \frac{R-G}{MAX-MIN} + 240, & \text{if } MAX = B \quad (3) \end{cases}$$

$$S = \frac{MAX - MIN}{MAX} \quad (4)$$

$$V = MAX \quad (5)$$

$$S = MAX - MIN \quad (6)$$

The gain control amount calculating section 24 is configured to calculate a gain control amount k when performing gain control in the gain controlling section 25 which will be hereinafter described, based on each signal of the hue signal H, the saturation signal S, and the value signal V of the HSV signals which are output from the color space converting section 23. Specifically, as will be hereinafter described in detail, the gain control amount calculating section 24 detects each one of the components, the hue, the saturation, and the value from the HSV signals, while controlling them with coefficients preliminarily set for the region of the each component and combining the resulted components, thereby calculating a gain control amount k. That is, by controlling the gain control amount k such that it becomes, e.g., 0 to n (n: arbitrary value), the sharpness improvement effect which will be hereinafter described varies.

Figure 3:
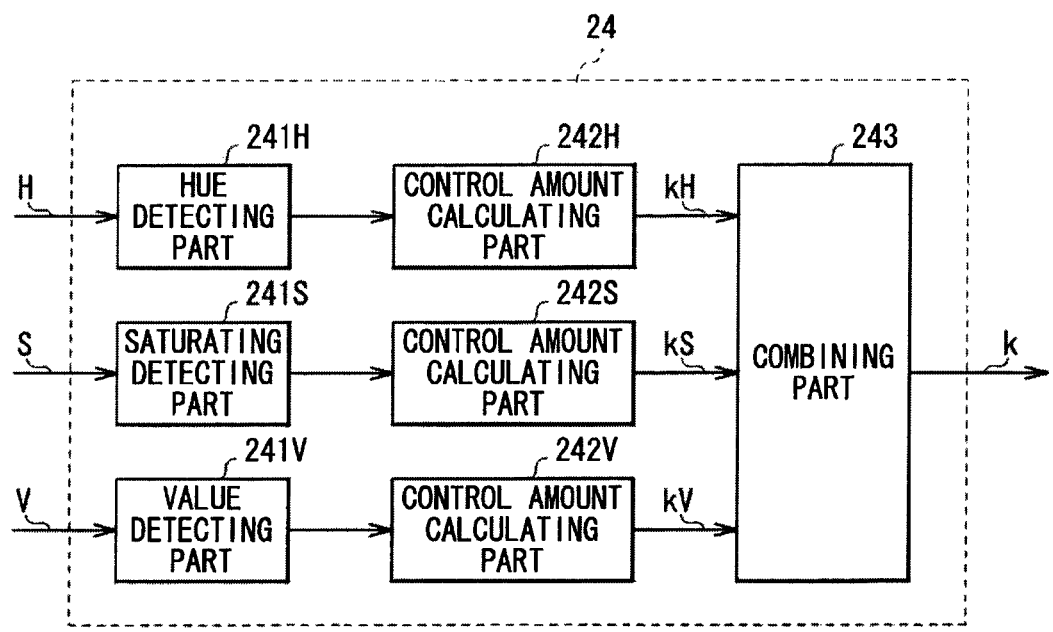
FIG. 3 is a block diagram illustrating an example of a detailed configuration of a gain control amount calculating section shown in FIG. 1.

As shown in FIG. 3, the gain control amount calculating section 24 includes: a hue detecting part 241H; a saturation detecting part 241S; a value detecting part 241V; control amount calculating parts 242H, 242S, and 242V; and a combining part 243.

Figure 4:
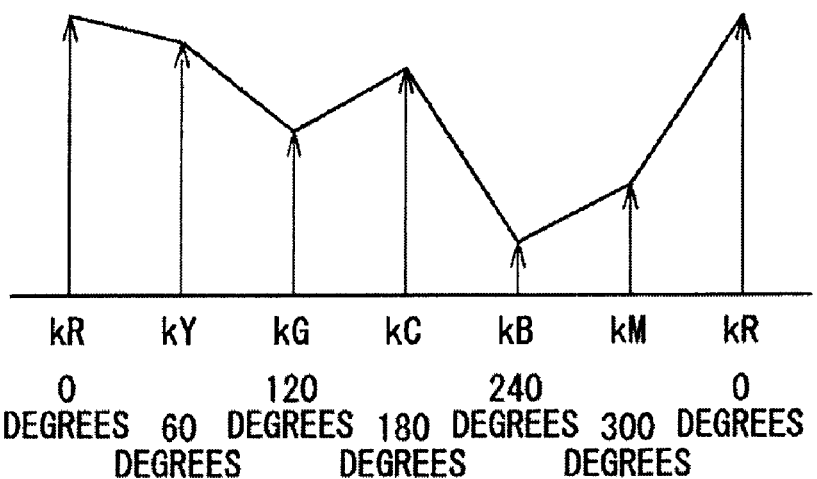
FIG. 4 is a characteristic diagram for explaining an operation of a control amount calculating section for a hue shown in FIG. 3.

The hue detecting part 241H is configured to detect hue information from a hue signal H. The control amount calculating part 242H is configured to obtain a control amount for the hue by using preliminarily set values shown in, e.g., FIG. 4. Specifically, the coefficients of the hue, kR, kY, kG, kC, kB, and kM, which are preliminarily set for every 60 degrees, are used for the hue detected in the hue detecting part 241H, so that linear interpolation is carried out for the hue coefficients values at two sides, between the hues at every 60 degrees, to thereby calculate the control amount of the entire regions of the hue.

Figure 5:
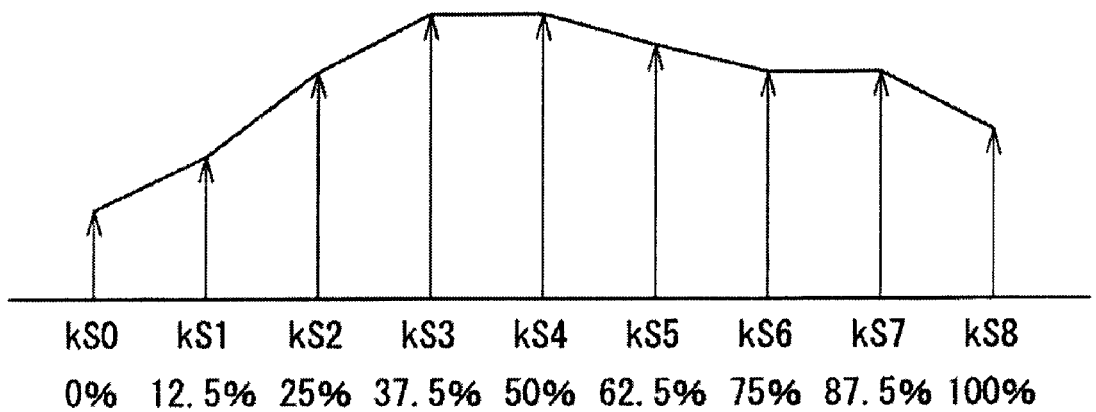
FIG. 5 is a characteristic diagram for explaining an operation of the control amount calculating section for a saturation value shown in FIG. 3.

The saturation detecting part 241S is configured to detect hue information from a saturation signal S. The control amount calculating part 242S is configured to obtain a control amount for the saturation value by using preliminarily set values shown in, e.g., FIG. 5. Specifically, the coefficients of the saturation value, kS0, kS1, kS2, k53, k54, k55, k56, and k57, which are preliminarily set for every 12.5% are used for the saturation detected in the saturation detecting part 241S, so that linear interpolation is carried out for the saturation coefficients values at two sides, between the saturation values at every 12.5%, to thereby calculate the control amount of the entire regions of the saturation value.

Figure 6:
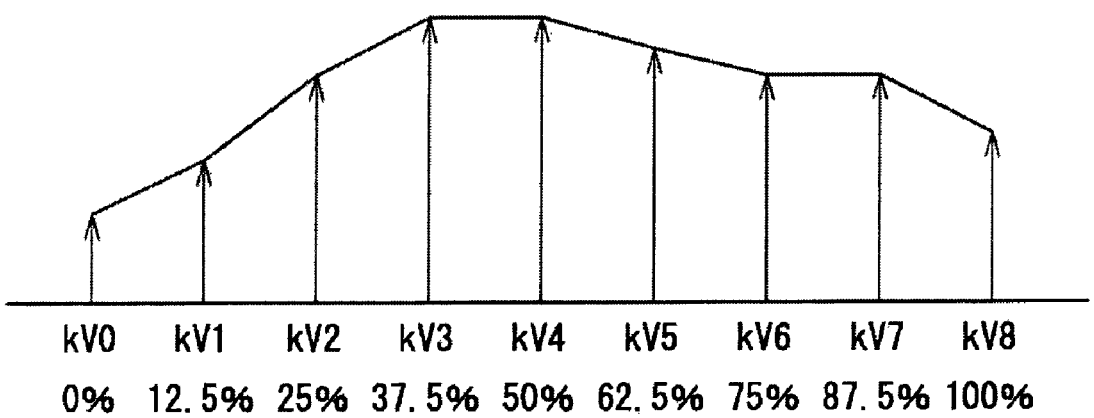
FIG. 6 is a characteristic diagram for explaining an operation of the control amount calculating section for a value shown in FIG. 3.

The value detecting part 241V is configured to detect value information from a value signal V. The control amount calculating part 242V is configured to obtain a control amount for the value by using preliminarily set values shown in, e.g., FIG. 6. Specifically, the coefficients of the value, kV0, kV1, kV2, kV3, kV4, kV5, kV6, and kV7, which are preliminarily set for every 12.5% are used for the value detected in the value detecting part 241V, so that linear interpolation is carried out for the value coefficients values at two sides, between the values at every 12.5%, to thereby calculate the control amount of the entire region of the value.

The combining part 243 is configured to combine each control amount calculated by control amount calculating parts, 242H, 242S, and 242V, to thereby calculate a gain control amount k corresponding to the combined control amount.

The gain controlling section 25 is configured to perform gain control for a high-frequency luminance signal Yh that is output from the high-frequency separating section 22, by using the gain control amount k that is output from the gain control amount calculating section 24, to thereby generate a high-frequency luminance signal Yhk after gain control. Specifically, by altering the amount of the high-frequency component in the high-frequency luminance signal Yh using the gain control amount k, the gain controlling section 25 is configured to generate the high-frequency luminance signal Yhk after gain control.

The combining section 26 is configured to perform a combining process based on the value signal V among the HSV signals that are output from the color space converting section 23 and the high-frequency luminance signal Yh that is output from the high-frequency separating section 22, to thereby generate a combined value signal. Specifically, here, the combining section 26 combines the value signal V with the high-frequency luminance signal Yhk after gain control which is output from the gain controlling section 25, thereby generating a combined value signal (V+Yhk).

The color space converting section 27 is configured to perform color space conversion for video signals (HSV signals) which are configured of a hue signal H and a saturation signal S among the HSV signals that are output from the color space converting section 23 and the combined value signal (V+Yhk) that is output from the combining section 26. With this arrangement, RGB signals, namely RGBout which are output video signals defined in RGB color space are generated. The color space converting section 27 is configured by a matrix circuit, etc. having a characteristic which is the inverse of the color space converting section 23. Here, suppose that the value of the hue signal H varies within the range between 0.0 and 360.0 and is expressed in terms of the degree of an angle and that the values of the saturation signal S and the value signal V vary within the range between 0.0 and 1.0, the conversion from HSV color space into RGB color space is performed by using the following Equations (7) to (17). Incidentally, in the case where the value of the saturation signal S is 0.0, the ultimate color is achroma or grey. In such a special case, the value for the each signal, R, G, and B simply becomes equivalent to the value of the value signal V, and in this case, the value of the hue signal H is meaningless. On the other hand, when the value of the saturation signal S is not 0.0, the color conversion is performed by using the following Equation (18).

$$Hl = \left\lfloor \frac{H}{60} \right\rfloor \bmod 6 \quad (7)$$

$$f = \frac{H}{60} - Hi \quad (8)$$

$$\begin{cases} p = V(1-S) & (9) \\ q = V(1-fS) & (10) \\ t = V(1-(1-f)S) & (11) \end{cases}$$

$$\begin{cases} \text{if } Hl = 0 \to R = V, & G = t, & B = p & (12) \\ \text{if } Hl = 1 \to R = q, & G = V, & B = p & (13) \\ \text{if } Hl = 2 \to R = p, & G = V, & B = t & (14) \\ \text{if } Hl = 3 \to R = p, & G = q, & B = V & (15) \\ \text{if } Hl = 4 \to R = t, & G = p, & B = V & (16) \\ \text{if } Hl = 5 \to R = V, & G = p, & B = q & (17) \end{cases}$$

$$H = \begin{cases} \left(Rgain \times \frac{Hx}{60}\right) + \left(Ygain \times \frac{60 - Hx}{60}\right) & \text{if } 0 \le Hx < 60 \\ \left(Ygain \times \frac{Hx}{60}\right) + \left(Ggain \times \frac{60 - Hx}{60}\right) & \text{if } 60 \le Hx < 120 \\ \left(Ggain \times \frac{Hx}{60}\right) + \left(Cgain \times \frac{60 - Hx}{60}\right) & \text{if } 120 \le Hx < 180 \\ \left(Cgain \times \frac{Hx}{60}\right) + \left(Bgain \times \frac{60 - Hx}{60}\right) & \text{if } 180 \le Hx < 240 \\ \left(Bgain \times \frac{Hx}{60}\right) + \left(Mgain \times \frac{60 - Hx}{60}\right) & \text{if } 240 \le Hx < 300 \\ \left(Mgain \times \frac{Hx}{60}\right) + \left(Rgain \times \frac{60 - Hx}{60}\right) & \text{if } 300 \le Hx < 360 \end{cases} \quad (18)$$

[Display Section 3]

The display section 3 displays an image based on the video signals (RGB signals, RGBout) after being processed, which are output from the video signal processing unit 2. As for such display section 3, a variety of displays such as, e.g., an LCD (Liquid Crystal Display), a PDP (Plasma Display Panel) display, and an organic EL (Electro Luminescence) display may be used.

Here, the RGB signals, RGBin correspond to an example of the "input video signals" of the embodiment of the present invention; and the RGB signals, RGBout correspond to an example of the "output video signals" of the embodiment of the present invention. Further, the HSV signals that are output from the color space converting section 23 correspond to an example of "converted video signals" of the embodiment of the present invention. The color space converting section 23 corresponds to an example of the "first color space converting section" of the embodiment of the present invention; the color space converting section 21 corresponds to an example of a "third color space converting section" of the embodiment of the present invention; and the color space converting section 27 corresponds to an example of the "second color space converting section" of the embodiment of the present invention. The high-frequency separating section 22 corresponds to an example of a "first high-frequency separating section" of the embodiment of the present invention; and the gain control amount calculating section 24 corresponds to an example of the "calculating section" of the embodiment of the present invention.

[Action and Effect of Display Apparatus 1]

The actions and effects exhibited by the display apparatus 1 will be described in detail in comparison to comparative examples.

[Basic Operation]

The display apparatus 1 performs, in the video signal processing unit 2, for RGB signals, RGBin that are input from the outside, a sharpness improvement process which hereinafter be described, thereby generating RGB signals, RGBout after being processed for sharpness improvement. The image is displayed based on the RGB signals, RGBout by the display section 3.

[Video Signal Process in First Comparative Example]

Figure 7:
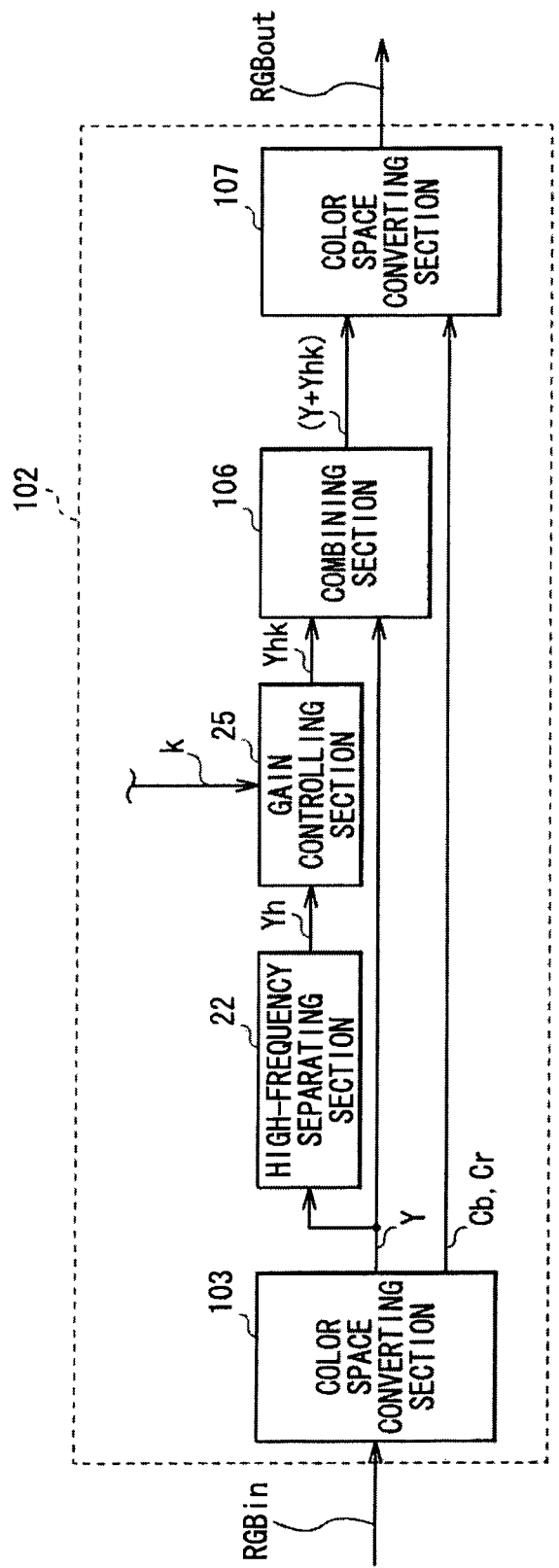
FIG. 7 is a block diagram illustrating a configuration of a video signal processing device according to a first comparative example.

FIG. 7 is a block diagram of a video signal processing unit 102 in related art according to a first comparative example. The video signal processing unit 102 includes: a color space converting section 103; the high-frequency separating section 22; the gain controlling section 25; a combining section 106; and a color space converting section 107.

The color space converting section 103 is configured to perform color space conversion for the RGB signals, namely RGBin that are input from the outside, to thereby generate YCbCr signals, and is configured by, e.g., a matrix circuit. Specifically, in the case where the RGB signals, namely RGBin are general television signals, coefficients in accordance with standards such as, for example, BT.709 and BT.601 are used when performing the color space conversion, as expressed by the following Equations (19) to (21). Incidentally, in the case where the signals input to the video signal processing unit 102 is originally YCbCr signals, there may be the case where the color space converting unit 103 is not provided.

$$\begin{cases} E'_Y = 0.2126E'_R + 0.7152E'_G + 0.0722E'_B & (19) \\ E'_{CB} = 0.5389(E'_B - E'_Y) & (20) \\ E'_{CR} = 0.6350(E'_R - E'_Y) & (21) \end{cases}$$

The gain controlling section 25 is configured to, like the one in the present embodiment, perform gain control for the high-frequency luminance signal Yh that is output from the high-frequency separating section 22, to thereby generate the high-frequency luminance signal Yhk after gain control. In the first comparative example, however, the gain control amount k is to be set in accordance with, for example, the operation of a user, etc.

The combining section 106 is configured to combine a luminance signal Y that is output from the color space converting section 103 and a high-frequency luminance signal Yhk after gain control that is output from the gain controlling section, thereby generating a combined luminance signal (Y+Yhk).

The color space converting section 107 is configured to perform color space conversion for video signals (YCbCr signal) which are configured of color difference signals Cb and Cr that are output from the color space converting section 103 and the combined luminance signal (Y+Yhk) that is output from the combining section 106. With this arrangement, RGB signals, namely RGBout are generated, which are output video signals defined in RGB color space. The color space converting section 107 is configured by a matrix circuit, etc. having a characteristic which is the inverse of the color space converting section 103.

Figure 8:
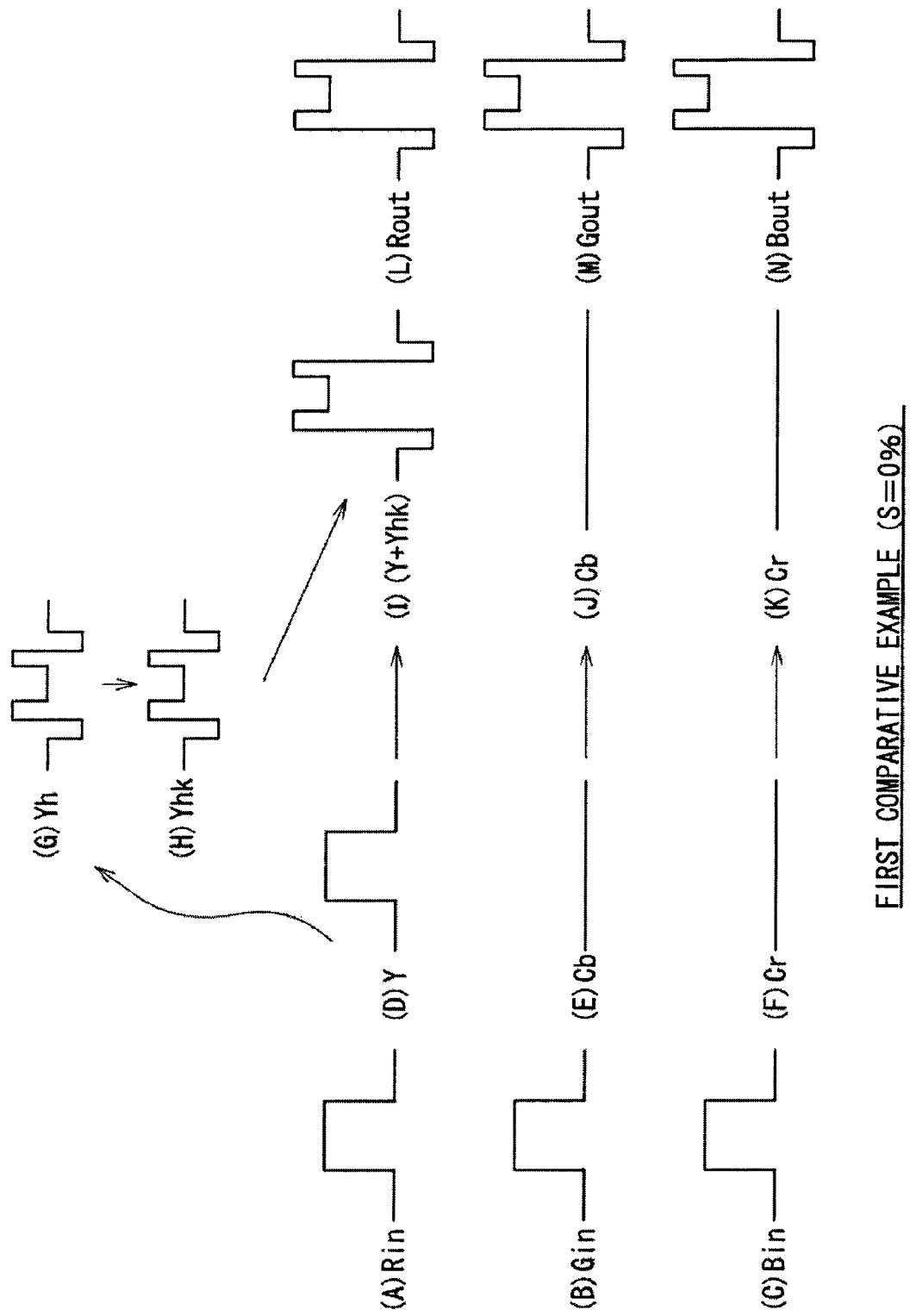
FIG. 8 is a timing waveform chart illustrating an operation example of the video signal processing device shown in FIG. 7.
Figure 9:
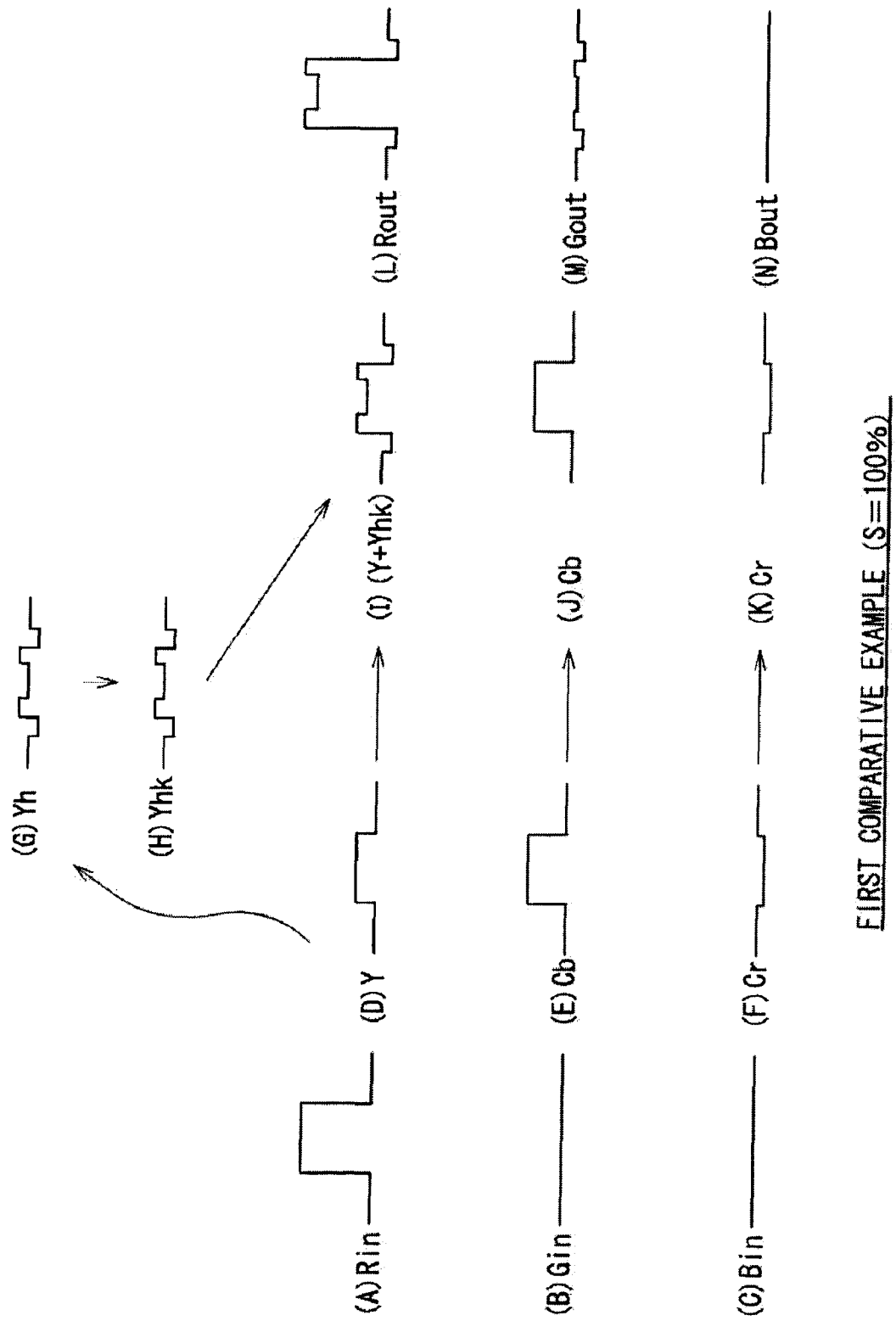
FIG. 9 is a timing waveform chart illustrating another operation example of the video signal processing device shown in FIG. 7.

Here, FIGS. 8 and 9 illustrate timing waveform examples for each of the signals when performing a video signal process in the video signal processing unit 102. FIG. 8 shows an example of the case where the saturation S of the RGB signals, RGBin is 0% (S=0%); and FIG. 9 shows an example of the case where the saturation S of the RGB signals, RGBin is 100% (S=100%). In these figures, (A), (B), (C), (D), (E), (F), (G), and (H) respectively denote: an R signal, Rin; a G signal, Gin; a B signal, Bin; a luminance signal Y; a color difference signal Cb; a color difference signal Cr; a high-frequency luminance signal Yh; and a high-frequency luminance signal after gain control Yhk. Further, (I), (J), and (K) respectively denote: a combined luminance signal (Y+Yhk); the color difference signal Cb (the same as the signal shown in (E)); and the color difference signal Cr (the same as the signal shown in (F)). Yet further, (L), (M), and (N) respectively denote: among the RGB signals, RGBout, an R signal, Rout; a G signal, Gout; and a B signal Bout. Incidentally, here, as the high-frequency separating section 22, a three-tap highpass filter circuit is used, while the gain control amount k in the gain controlling section 25 is set to 1 (k=1).

Firstly, as shown in FIG. 8, in the case of the saturation S=0%, here, the signal levels of the R signal, Rin, G signal, Gin, and B signal, Bin are in the same level ((A) to (C) in FIG. 8), and thus the color signals Cb and Cr become 0 level ((E) and (F) in FIG. 8). In this case, since the saturation is 0%, in the RGB signals, namely RGBout that are output, each of the R signal, Rout, G signal, Gout, and B signal, Bout is provided with a high-frequency component of the same signal level based on the luminance combined signal (Y+Yhk) ((L) to (N) in FIG. 8). Accordingly, the sharpness is improved in each of the signals, the R signal, Rout, the G signal, Gout, and the B signal, Bout, in comparison with the original RGB signals, RGBin.

On the other hand, as shown in FIG. 9, in case of saturation S=100%, the signal level of an R signal, Rin is allocated to a luminance signal Y and color difference signals Cb and Cr ((A) and (D) to (F) in FIG. 9). Specifically, for example, in the case of a BT.709 matrix circuit, when the value of the R signal, Rin is 1.00 and when the values of the G signal, Gin and B signal, Bin are 0.00, the value of the luminance signal Y is 0.2126, the value of the color difference signal Cb is −0.1146, and the value of the color difference signal Cr is 0.5000. In this case, where the saturation S=100%, the component of the Yhk in the luminance combined signal (Y+Yhk) is provided to the R signal, Rout, as well as to the G signal, Gout and B signal, Bout ((I) and (L) to (N) in FIG. 9).

Here, in this first comparative example, when comparing the result shown in FIG. 8 with that shown in FIG. 9, in the case where the saturation is high (FIG. 9), the reduction in saturation occurs at the portion where the sharpness is improved (high-frequency component area) in output signals, that is, RGB signals, RGBout (FIG. 9 (L) to (N)).

Further, in the case where the saturation is high (FIG. 9), the signal level of the luminance signal Y becomes low due to the matrix ratio (FIG. 9(D)), and then a high-frequency luminance signal Yh itself becomes small, resulting in reduced sharpness improvement effect (FIG. 9 (L) to (N)). This signal level reduction in the luminance signal Y due to the saturation also varies depending on the hue, and in the case of BT. 709, for example, the following is true. That is, since the matrix ratio of the luminance signal Y is: R=0.2126, G=0.7152, and B=0.0722, the signal level in the case of saturation S=100% based on the case where the saturation is 0% is: 0.2126 in red; 0.7152 in green; and 0.0722 in blue. Accordingly, the greater the hue or the saturation in the input signals, namely RGB signals, RGBin becomes, the lower the signal level of the luminance signal Y becomes, resulting in reduction in sharpness improvement effect.

Therefore, in the method shown in the first comparative example, since an image sharpness improvement process is performed by combining a luminance signal Y based on RGB signals, RGBin with a high-frequency luminance signal Yhk after gain control, the image sharpness improvement effect in RGB signals, RGBout is insufficient.

[Video Signal Process According to the Present Embodiment]

In contrast, in the video signal processing unit 2 according to the present embodiment, as shown in FIG. 1, the sharpness improvement process as follows is performed for input RGB signals, RGBin. Firstly, the color space converting sections 21 and 23 perform color space conversion for the RGB signals, RGBin, to thereby respectively generate a luminance signal Y and HSV signals. Next, in the high-frequency separating section 22, the high-frequency component is separated from the luminance signal Y, to thereby generate the high-frequency luminance signal Yh. Then, in the gain control section 25, for the high-frequency luminance signal Yh, gain control is performed by using a gain control amount k that is output from the gain control amount calculating section 24, thereby generating a high-frequency luminance signal Yhk after the gain control. Next, in the combining section 26, a value signal V among the HSV signals and a high-luminance signal Yhk after the gain control are combined, whereby a combined value signal (V+Yhk) is generated. Further, in the color space converting section 27, for video signals which are configured of a hue signal H and a saturation signal S among the HSV signals and the combined value signal (V+Yhk), the color space conversion is performed, whereby RGB signals, RGBout, which are output video signals, are generated.

That is, by combining the value signal V based on RGB signals, RGBin that are input video signals with the high-frequency luminance signal Yhk after gain control based on the RGB signals RGBin, an image sharpness improvement process is performed. With this arrangement, unlike the first comparative example 1 in which the image sharpness improvement process is performed by combining a luminance signal Y based on RGB signals, RGBin with a high-frequency luminance signal Yhk after gain control, the aforementioned problem does not arise. That is, in the RGB signals, RGBout, it is possible to avoid the reduction in the saturation at the portion where the sharpness is improved (high-frequency component area), the reduction in the sharpness improvement effect depending on the magnitude of the hue or the saturation in the RGB signals, RGBin, etc.

Figure 10:
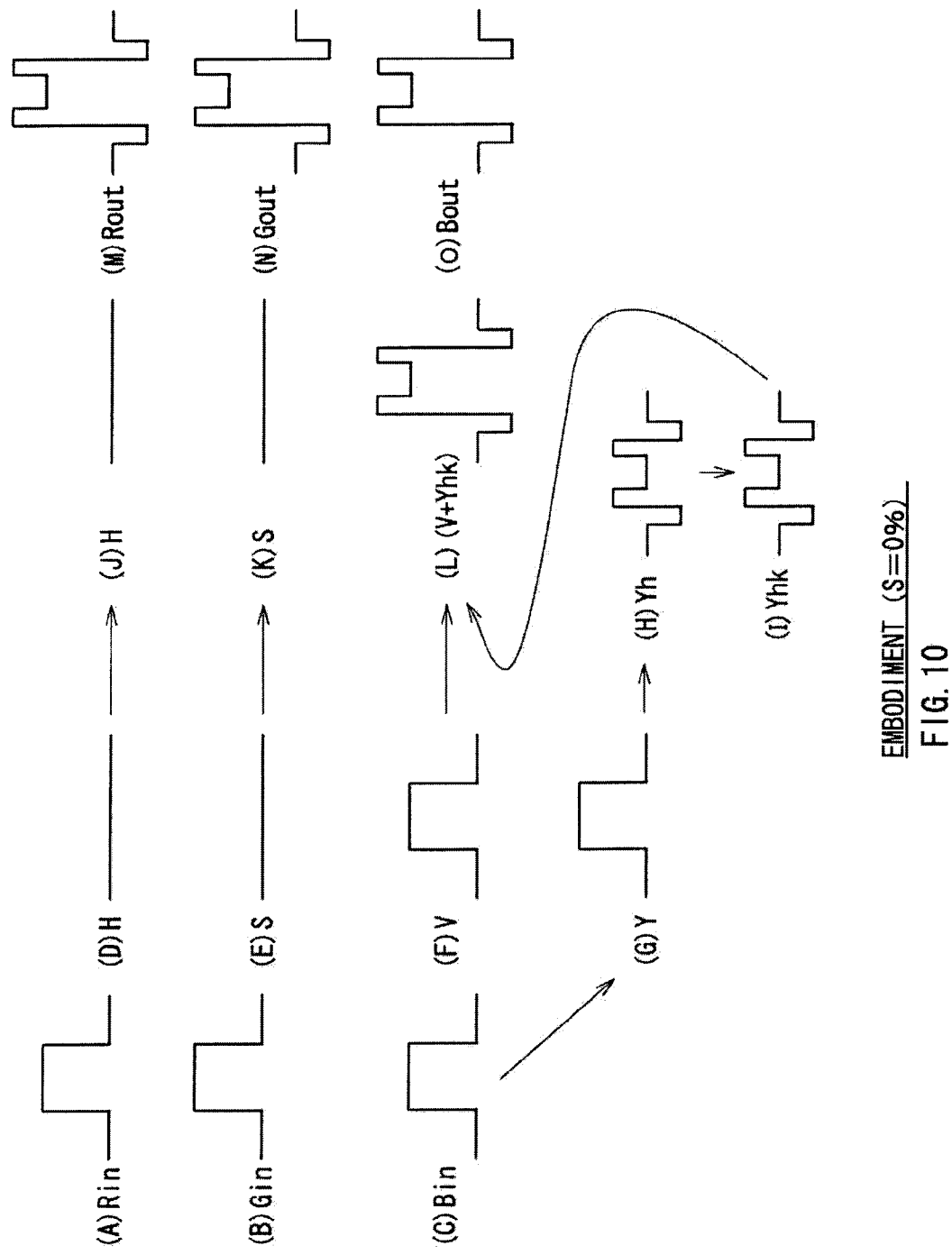
FIG. 10 is a timing waveform chart illustrating an operation example of the video signal processing device shown in FIG. 1.
Figure 11:
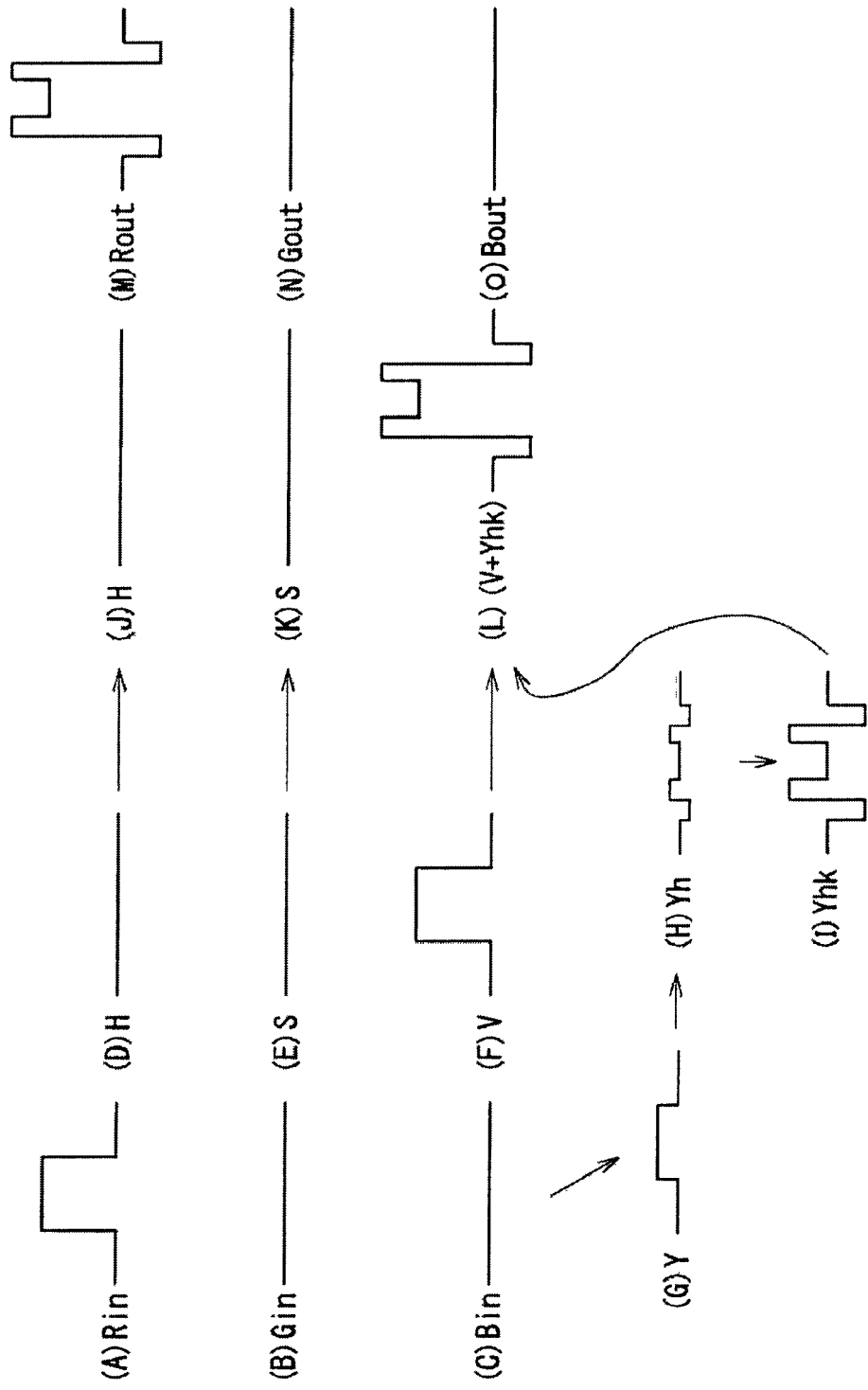
FIG. 11 is a timing waveform chart illustrating another operation example of the video signal processing device shown in FIG. 1.

Here, FIGS. 10 and 11 illustrate timing waveform examples for each of the signals when performing a video signal process in the video signal processing unit 2. FIG. 10 shows an example of the case where the saturation S of the RGB signals, RGBin is 0% (S=0%); and FIG. 11 shows an example of the case where the saturation S of the RGB signals, RGBin is 100% (S=100%). In these figures, (A), (B), (C), (D), (E), and (F) respectively denote: an R signal, Rin; a G signal, Gin; a B signal, Bin; a hue signal H; a saturation signal S; and a value signal V. Further, (G), (H), and (I) respectively denote: a luminance signal Y; a high-frequency luminance signal Yh; and a high-frequency luminance signal Yhk after gain control. Yet further, (J), (K), and (L) respectively denote: the hue signal H (the same as the signal shown in (D)); the saturation signal S (the same as the signal shown in (E)); and a combined value signal (V+Yhk). Yet further, (M), (N), and (O) respectively denote, among the RGB signals, RGBout: an R signal, Rout; a G signal Gout; and a B signal Bout. Incidentally, here, as the high-frequency separating section 22, a three-tap highpass filter circuit shown in FIG. 2 is used, while the gain control amount k in the gain controlling section 25 is set to 1 (k=1) in FIG. 10 and is set to 4 (k=4) in FIG. 11.

Firstly, as shown in FIG. 10, in the case of the saturation S=0%, the levels of the R signal, Rin, G signal, Gin, and B signal, Bin are in the same level ((A) to (C) in FIG. 10). Accordingly, the following are true: the signal level of the saturation signal S becomes 0; the signal level of the value signal V becomes max (R, G, B) (the maximum value among the R signal Rin, G signal Gin, and B signal Bin); and the hue signal H becomes 0 level which is a fixed value, because the saturation is 0%. ((D) to (F) in FIG. 10). In this case, since the saturation is 0%, also in the RGB signals, namely RGBout that are output, the high-frequency components in the same signal level based on the value combined signal (V+Yhk) are provided to each one of the R signal, Rout, G signal, Gout, and B signal, Bout ((M) to (O) in FIG. 10). Accordingly, in each of the R signal, Rout, G signal, Gout, and B signal, Bout, the sharpness is improved in comparison with the original RGB signals, RGBin as those shown in the first comparative example.

On the other hand, as shown in FIG. 11, in case of saturation S=100%, here, since the hue H is 0 degree)(H=0°)(red), the signal level of the saturation signal S becomes 0, the signal level of the value signal V becomes max (R, G, B), and the hue signal H becomes 0 level which is a fixed value ((D) to (F) in FIG. 11). Further, according to the present embodiment, as has been described, since the value signal V is combined with the high-frequency luminance signal Yhk after the gain control without altering the hue signal H and the saturation signal S, the Yhk component of the value combined signal (V+Yhk) is provided only to the R signal, Rout ((M) in FIG. 11). Accordingly, as has been described, it can be seen that in the RGB signals (RGBout), the reduction in the saturation in a portion where sharpness is improved (high-frequency component area), the reduction in sharpness improvement depending on the magnitude of the hue or the saturation in the RGB signals (RGBin), etc. are avoided ((M) to (O) in FIG. 11).

As described above, according to the present embodiment, in the video signal processing unit 2, the value signal V based on the RGB signals, RGBin is combined with the high-frequency luminance signal Yhk after gain control based on that RGB signals RGBin, to thereby perform an image sharpness improvement process. With this arrangement, the problems that arise in the first comparative example above do not occur. That is, in the RGB signals, RGBout, the reduction in the saturation in a portion where the sharpness is improved (high-frequency component area), the reduction in the sharpness improvement effect depending on the magnitude of the hue or the saturation in the RGB signals, RGBin, etc. are avoided. Therefore, it is possible to more appropriately improve the sharpness of an image.

Further, since the gain control section 25 which performs gain control for a high-frequency luminance signal Yh is provided while in the combining section 26, a luminance signal V and a high-luminance signal Yhk after gain control are combined to thereby generate a combined value signal (V+Yhk), it is possible to perform a sharpness improvement process for a desired amount in the desired areas of the hue, the saturation and the value.

Further, since the gain control amount calculating section 24 which calculates a gain control amount k when performing gain control based on the hue signal H, the saturation signal S, and the value signal V, is provided, it is possible to perform a desired gain adjustment by using the hue signal H, the saturation signal S, and the value signal V based on the RGB signals, RGBin.

2. MODIFIED EXAMPLES

Hereinbelow, modified examples according to the embodiment of the present invention will be described. Incidentally, like reference numerals are used to refer to like elements as those in the above embodiment, and description thereof will be omitted as needed.

First Modified Example

Figure 12:
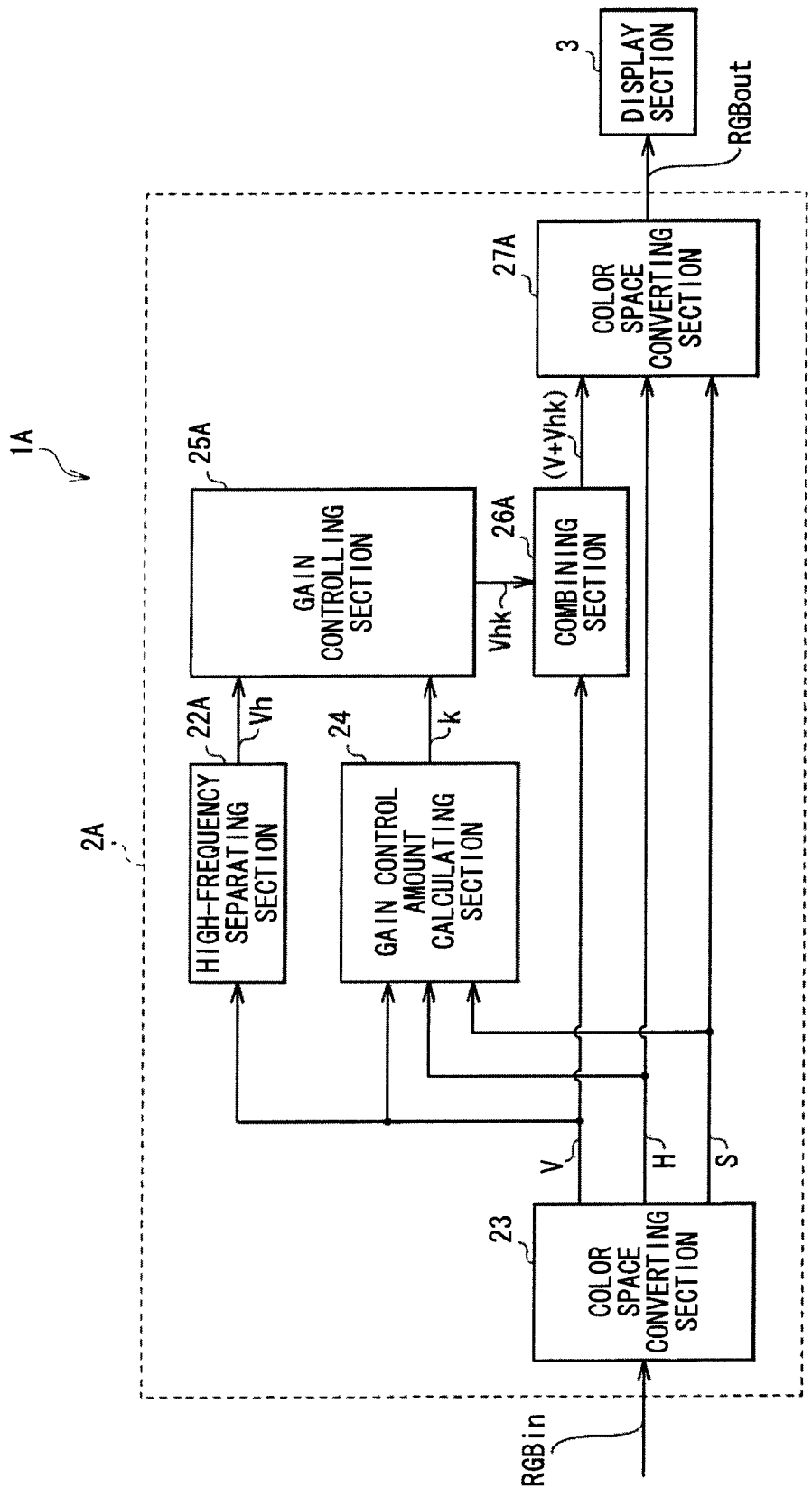
FIG. 12 is a block diagram illustrating the entire configuration of a display apparatus according to a first modified example of the embodiment of the present invention.

FIG. 12 is a block diagram of a display apparatus 1A according to the first modified example 1. The display apparatus 1A includes a video signal processing unit 2A instead of the video signal processing unit 2 in the display apparatus 1 in the above embodiment. That is, in the video signal processing unit 2A is configured to generate a high-frequency component for increasing the sharpness not from the luminance signal Y as shown in the above embodiment, but from the value signal V, and thus deals with the case where the value signal V and the high-frequency value signal Vhk after the gain control which will be described below are combined.

The video signal processing unit 2A includes: color space converting sections 23 and 27A; a high-frequency separating section 22A; the gain control amount calculating section 24; a gain control section 25A; and a combining section 26A. That is, in the video signal processing 2, the color space converting section 21 is not provided, and instead of providing the high-frequency separating section 22, gain controlling section 25, the combining section 26, and the color space converting section 27, the high-frequency separating section 22A, the gain control section 25A, the combining section 26A, and the color space converting section 27A are provided.

The high-frequency separating section 22A is configured to separate a high-frequency component from the value signal V among the HSV signals that are output from the color space converting section 23, to thereby generate a high-frequency value signal Vh. The high-frequency separating section 22A is also configured by, like the high-frequency separating section 22, 1-dimensional or 2-dimensional highpass filter (HPF), etc. Incidentally, the high-frequency separating section 22A corresponds to an example of the "second high-frequency separating section" according to the embodiment of the present invention.

The gain controlling section 25A is configured to perform gain control for the high-frequency luminance signal Vh that is output from the high-frequency separating section 22A by using the gain control amount k that is output from the gain control amount calculating section 24, to thereby generate a high-frequency value signal Vhk after gain control. Specifically, by altering the amount of high-frequency component in the high-frequency value signal Vh using the gain control amount k, the gain controlling section 25A generates the high-frequency value signal Vhk after the gain control.

The combining section 26A is configured to perform a combining process based on the value signal V among the HSV signals that are output from the color space converting section 23 and the high-frequency value signal Vh that is output from the high-frequency separating section 22A, to thereby generate a combined value signal. Specifically, here, the combining section 26A combines the value signal V with the high-frequency value signal Vhk after the gain control that is output from the gain controlling section 25A, thereby generating a combined value signal (V+Vhk).

The color space converting section 27A is configured to perform color space conversion for video signals (HSV signals) which are configured of the hue signal H and the saturation signal S among the HSV signals that are output from the color space converting section 23, and the combined value signal (V+Yhk) that is output from the combining section 26A. With this arrangement, RGB signals, namely RGBout which are output video signals defined in RGB color space are generated. The color space converting section 27A is configured by a matrix circuit, etc. having a characteristic which is the inverse of the color space converting section 23. Incidentally, the color space converting section 27A corresponds to an example of the "second color space converting section" according to the embodiment of the present invention.

In the video signal processing unit 2A according to the present modified example, the value signal V based on the RGB signals, RGBin is combined with the high-frequency value signal Vhk after the gain control based on that RGB signals RGBin, to thereby perform the image sharpness improvement process. With this arrangement, by the actions similar to those of the above embodiment, the problems that arise in the first comparative example above do not occur. That is, in the RGB signals, RGBout, the reduction in the saturation in a portion where sharpness is improved (high-frequency component area), the reduction in sharpness improvement effect depending on the magnitude of the hue or the saturation in the RGB signals, RGBin, etc. are avoided.

Figure 13:
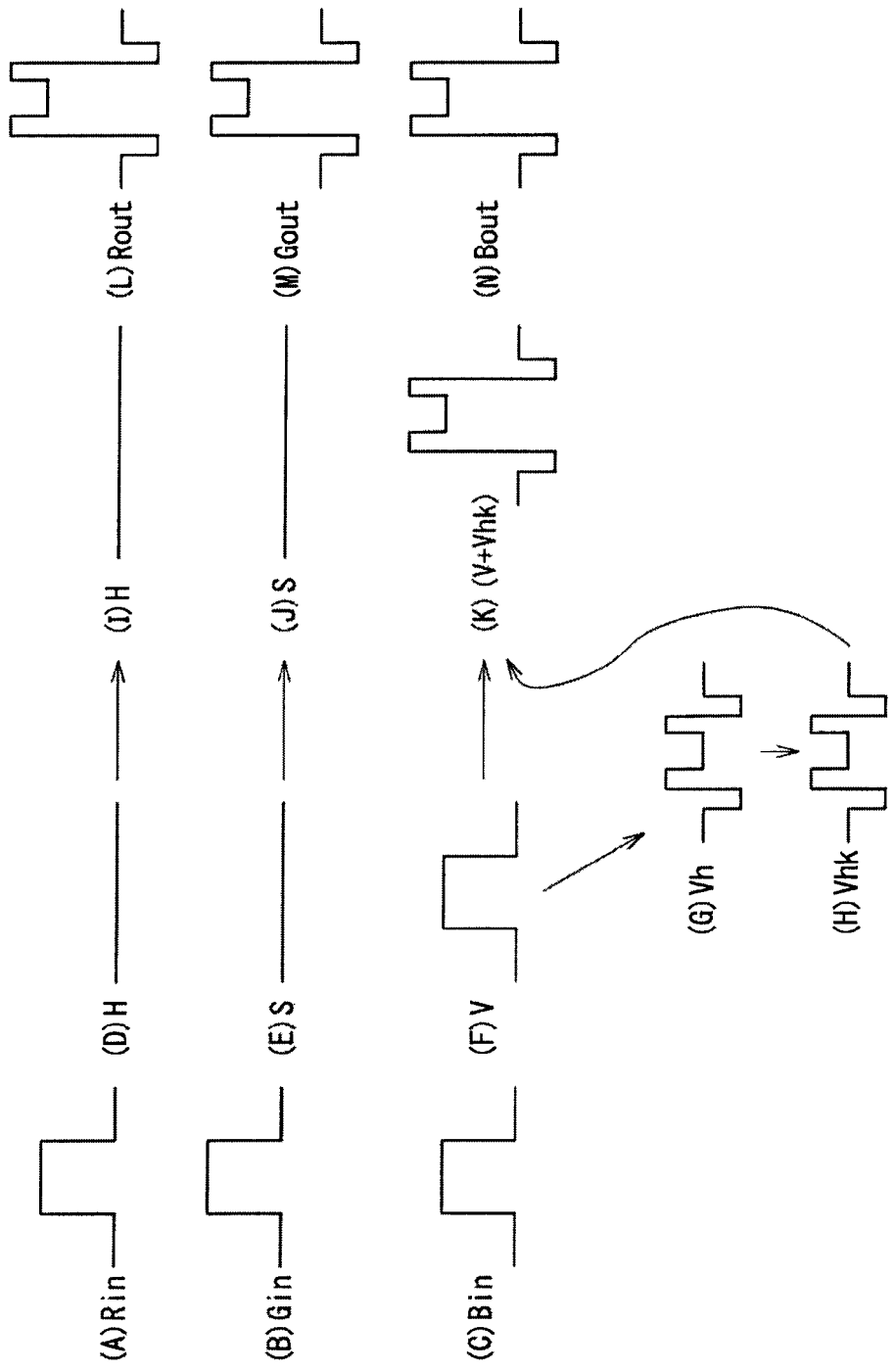
FIG. 13 is a timing waveform chart illustrating an operation example of the video signal processing device shown in FIG. 12.
Figure 14:
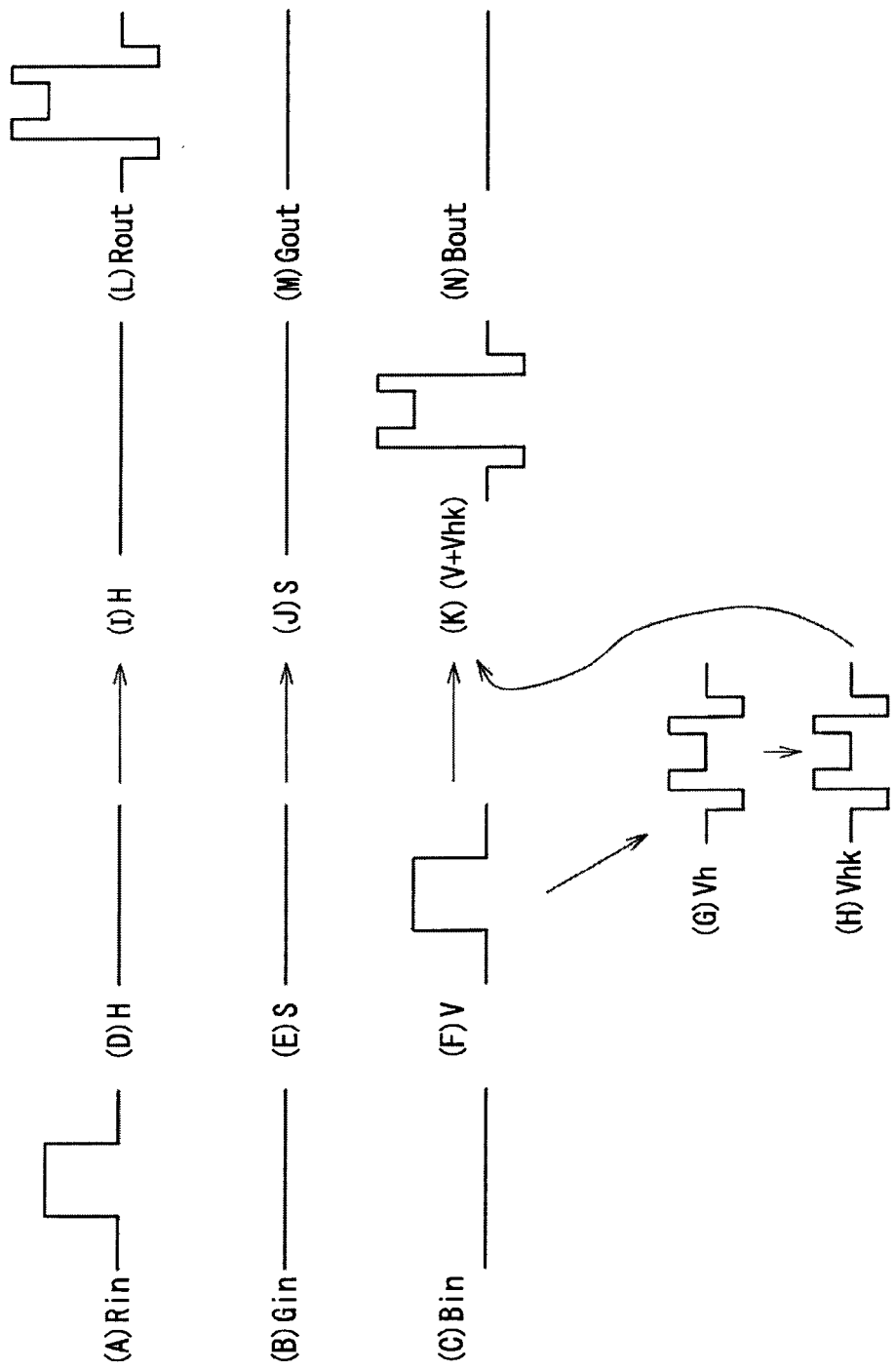
FIG. 14 is a timing waveform chart illustrating another operation example of the video signal processing device shown in FIG. 12.

FIGS. 13 and 14 illustrate timing waveform examples for each of the signals when performing a video signal process in the video signal processing unit 2A. FIG. 13 shows an example of the case where the saturation S of the RGB signals, RGBin is 0% (S=0%); and FIG. 14 shows an example of the case where the saturation S of the RGB signals, RGBin is 100% (S=100%). In these figures, (A), (B), (C), (D), (E), (F), (G), and (H), respectively denote: an R signal, Rin; a G signal, Gin; a B signal, Bin; a hue signal H; a saturation signal S; a value signal V; a high-frequency value signal Vh; and a high-frequency value signal after the gain control, Vhk. Further, (I), (J), and (K) respectively denote: the hue signal H (the same signal as the signal shown in (D)); the saturation signal S (the same as the signal shown in (E)); and a combined value signal (V+Vhk). Yet further, (L), (M), and (N) respectively denote, among the RGB signals, RGBout: an R signal, Rout; a G signal Gout; and a B signal, Bout. Incidentally, here, as the high-frequency separating section 22A, the three-tap highpass filter circuit shown in FIG. 2 is used, while the gain control amount k in the gain controlling section 25A is set to 1 (k=1).

Firstly, as shown in FIG. 13, in the case of the saturation S=0%, like the above embodiment, in each of the signals, the R signal, Rout, the G signal, Gout, and the B signal, Bout, the sharpness is improved in comparison with the original RGB signals, RGBin ((L) to (N) in FIG. 13).

Further, as shown in FIG. 14, in the case where the saturation S=100%, similar results as the above-embodiment are obtained. That is, in the RGB signals, RGBout, the reduction in saturation in a portion where sharpness is improved (high-frequency component area), the reduction in the sharpness improvement effect depending on the magnitude of the hue or the saturation in the RGB signals, RGBin, etc. are avoided ((L) to (N) in FIG. 14).

As described above, according to the present modified example, in the video signal processing unit 2A, the value signal V based on the RGB signals, RGBin is combined with the high-frequency value signal Vhk after gain control based on the RGB signals, RGBin, to thereby perform an image sharpness improvement process. With this arrangement, like results resulting from the like effect shown in the above embodiment are obtained. Therefore, it is possible to more appropriately improve the sharpness of an image.

Second Modified Example

Figure 15:
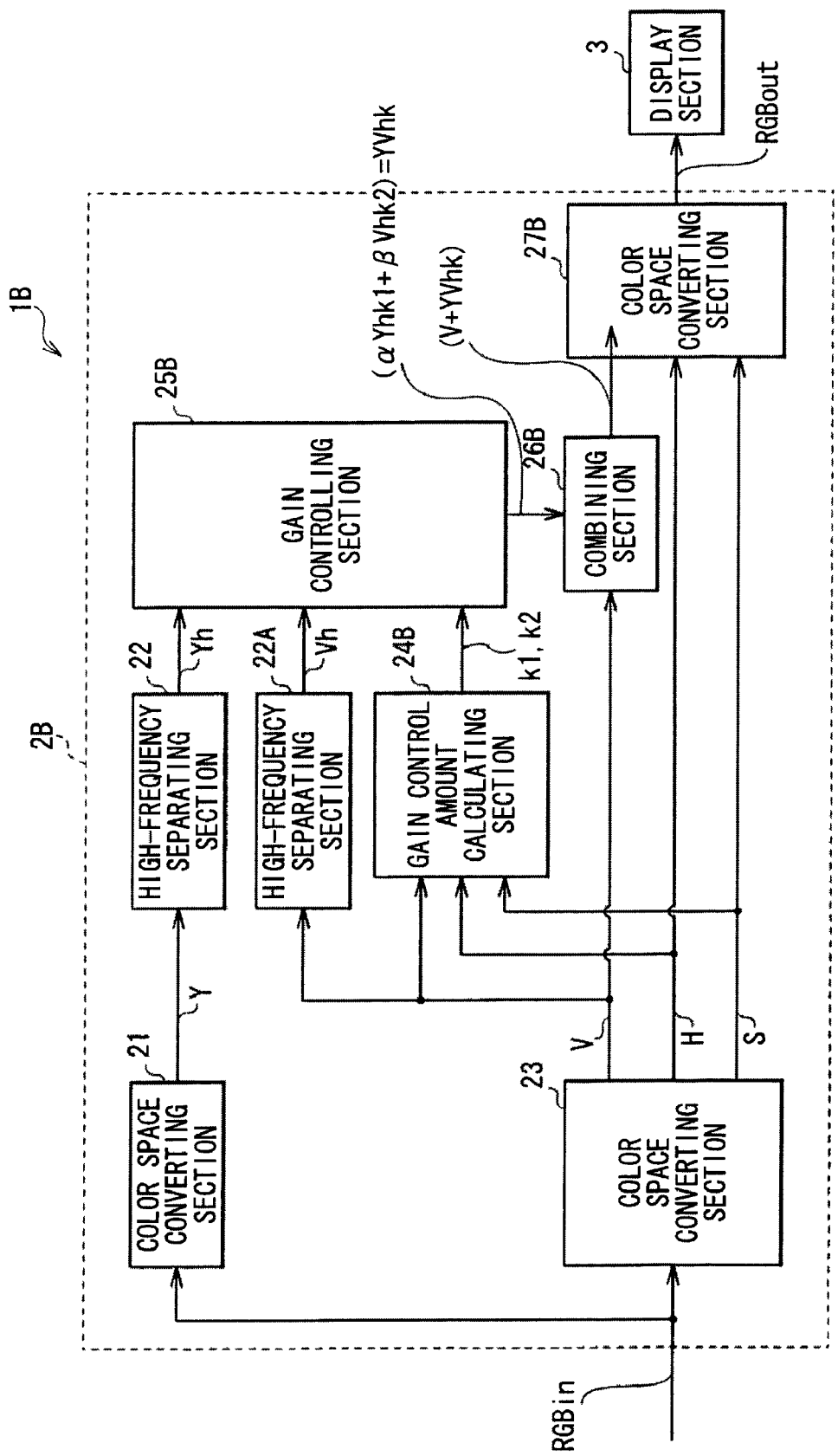
FIG. 15 is a block diagram illustrating the entire configuration of a display apparatus according to a second modified example of the embodiment of the present invention.

FIG. 15 is a block diagram of a display apparatus 1B according to a second modified example of the embodiment of the present invention. The display apparatus 1B includes a video signal processing unit 2B instead of the video signal processing unit 2 in the display apparatus 1 according to the above embodiment. That is, the display apparatus 1B deals with the combination of the art according to the above embodiment and the art of the first modified example, and with the case where the value signal V and a high-frequency combined signal YVhk after gain control which will be described below are combined.

The video signal processing unit 2B includes: color space converting sections 21, 23, and 27B; high-frequency separating sections 22 and 22A; a gain control amount calculating section 24B; a gain controlling section 25B; and a combining section 26B. That is, in the video signal processing 2A explained in the first modified example, the color space converting section 21 and the high-frequency separating section 22 described in the above embodiment are provided. Further, in the signal processing unit 2B, instead of the gain control amount calculating section 24, the gain controlling section 25A, the combining section 26A, and the color space converting section 27A, the gain control amount calculating section 24B, the gain controlling section 25B, the combining section 26B, and the color space converting section 27B are provided.

The gain control amount calculating section 24B is configured to calculate gain control amounts k1 and k2 when performing gain control in the gain controlling section 25B which will be hereinafter described, based on each of the signals, a hue signal H, a saturation signal S, and a value signal V which are output from the color space converting section 23. Here, the gain control amount k1 corresponds to the gain control amount for the high-frequency luminance signal Yh and the gain control amount k2 corresponds to the gain control amount for the high-frequency value signal Vh. Incidentally, the gain control amount calculating section 24 corresponds to an example of the "calculating section" according to the embodiment of the present invention.

The gain controlling section 25B is configured to perform gain control for a high-frequency luminance signal Yh that is output from the high-frequency separating section 22 by using the gain control amount k1 that is output from the gain control amount calculating section 24B, to thereby generate a high-frequency luminance signal Yhk after gain control. Specifically, by altering the amounts of high-frequency component in the high-frequency luminance signal Yh using the gain control amount k, the gain controlling section 25B generates the high-frequency luminance signal Yhk after the gain control. Further, the gain controlling section 25B performs gain control for the high-frequency value signal Vh that is output from the high-frequency separating section 22A, by using the gain control amount k2 that is output from the gain control amount calculating section 24B, thereby generating the high-frequency value signal Vhk after the gain control. Specifically, by altering the amount of the high-frequency component in the high-frequency value signal Vh using the gain control amount k2, the high-frequency value signal Vhk after the gain control is generated.

In the gain controlling section 25B, a combined signal (high-frequency combined signal YVhk) based on the high-frequency luminance signal Yh and the high-frequency value signal Vh is generated. Specifically, here, the high-frequency combined signal YVhk is generated based on the high-frequency luminance signal Yhk1 after the gain control and the high-frequency value signal Vhk2 after the gain control. In this operation, in the high-frequency combined signal YVhk, predetermined weighing operation is performed between the high-frequency luminance signal Yhk1 after the gain control and the high-frequency value signal Vhk2 after the gain control. That is, suppose such weighing coefficients are α and β, the operation is represented by:

YVhk=(α×Yhk1+β×Vhk2).

The combining section 26B is configured to perform a combining process based on the value signal V that is output from the color space converting section 23 and the combined signal based on the high-frequency luminance signal Yh and the high-frequency value signal Vh to thereby generate a combined value signal. Specifically, here, the combining section 26B combines the value signal V and the high-frequency combined signal YVhk that is output from the gain controlling section 25B, thereby generating the combined value signal (V+YVhk).

The color space converting section 27B is configured to perform color space conversion for the video signals (HSV signals) which are configured of the hue signal H and the saturation signal S that are output from the color space converting section 23 and the combined value signal (V+YVhk) that is output from the combining section 26B. With this arrangement, the RGB signals, RGBout, which are output video signals defined in the RGB color space are generated. The color space converting section 27B is configured by a matrix circuit, etc. having a characteristic which is the inverse of the color space converting section 23. Incidentally, the color space converting section 27B corresponds to an example of the "second color space converting section" according to the embodiment of the present invention.

With this arrangement, also in this modified example, like results resulting from the like effect shown in the above embodiment and the above first modified example are obtained. That is, it is possible to more appropriately improve the sharpness of an image.

Further, with the arrangement in which the value signal V is combined with the high-frequency combined signal YVhk that is output from the gain controlling section 25B, to thereby generate the combined value signal (V+YVhk), it is possible to improve the sharpness in the areas of both the high-frequency luminance signal and of the high-frequency value signal, concurrently.

Further, in the high-frequency combined signal YVhk, since predetermined weighing operation is performed between the high-frequency luminance signal Yhk1 after the gain control and the high-frequency value signal Vhk2 after the gain control, by altering the amount of weighing according to the characteristics of images, it is possible to perform optimum sharpness improvement process for each image.

Third Modified Example

Figure 16:
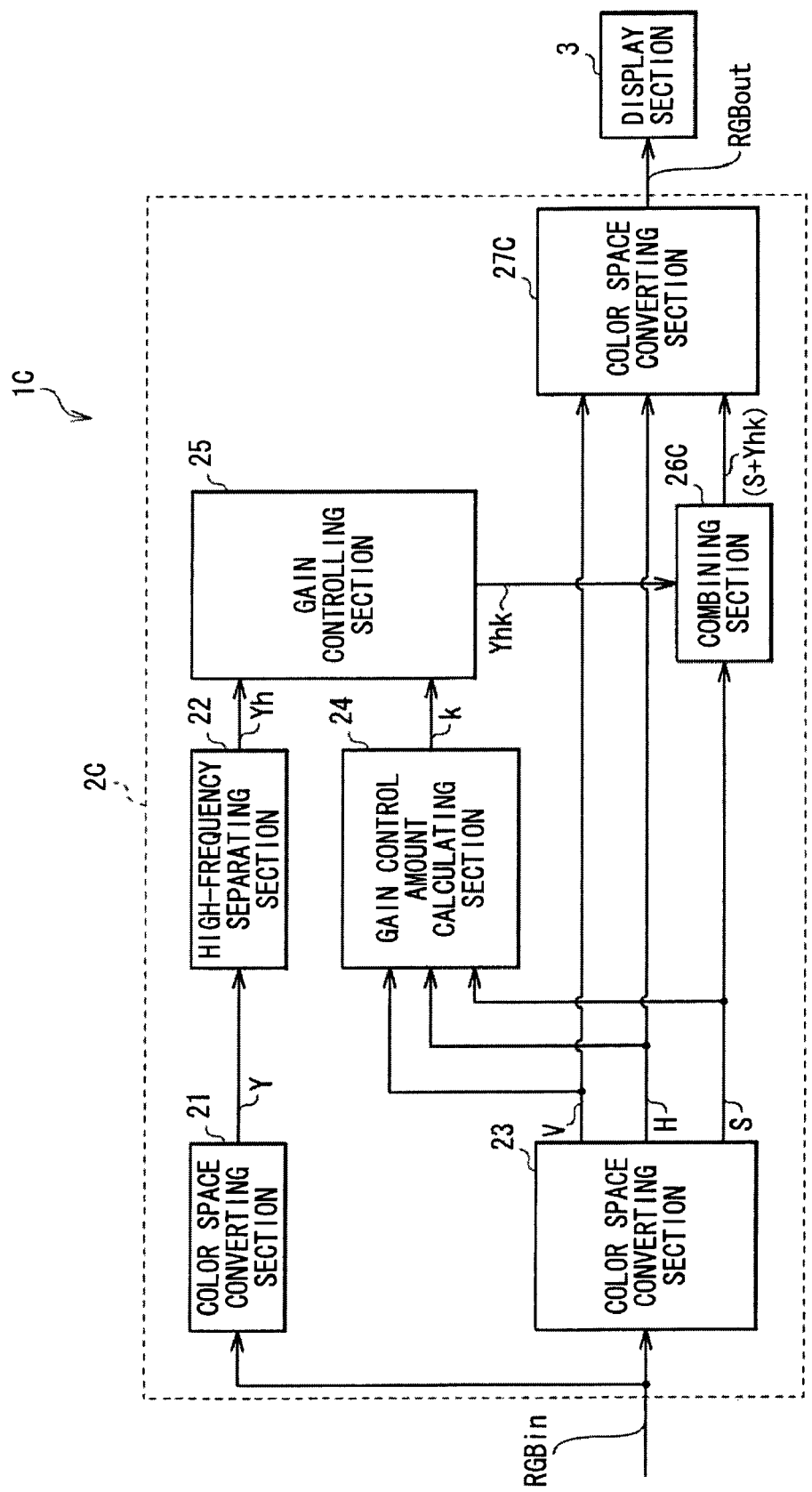
FIG. 16 is a block diagram illustrating the entire configuration of a display apparatus according to a third modified example of the embodiment of the present invention.

FIG. 16 is a block diagram of a display apparatus 1C according to a third modified example of the present invention. The display apparatus 1C includes a video signal processing unit 2C instead of the video signal processing unit 2 in the display apparatus 1 according to the above embodiment. That is, the display apparatus 1C deals with the case where the high-frequency luminance signal Yhk after the gain control is combined with the saturation signal S, but not with the value signal V.

The video signal processing unit 2C includes: color space converting sections 21, 23, and 27C; the high-frequency separating section 22; the gain control amount calculating section 24; the gain controlling section 25; and a combining section 26C. That is, instead of the combining section 26 and the color space converting section 27 in the video signal processing unit 2, the combining section 26C and the color space converting section 27 are provided in the video signal processing unit 2C.

The combining section 26C is configured to perform a combining process based on the saturation signal S among the HSV signals that are output from the color space converting section 23 and the high-frequency luminance signal Yh that is output from the high-frequency separating section 22 to thereby generate a combined saturation signal. Specifically, here, the combining section 26C combines the saturation signal S and the high-frequency luminance signal Yhk after the gain control that is output from the gain controlling section 25, thereby generating a combined saturation signal (S+Yhk).

The color space converting section 27C is configured to perform color space conversion for the video signals (HSV signals) which are configured of the value signal V and the hue signal H that are output from the color space converting section 23 and the combined saturation signal (S+Yhk) that is output from the combining section 26C. With this arrangement, the RGB signals, RGBout, which are output video signals defined in the RGB color space are to be generated. The color space converting section 27C is configured by a matrix circuit, etc. having a characteristic which is the inverse of the color space converting section 23. Incidentally, the color space converting section 27C corresponds to an example of the "second color space converting section" according to the embodiment of the present invention.

In the video signal processing section 2C according to the present modified example, an image sharpness improvement process is performed by combining the high-frequency luminance signal Yhk after the gain control based on the RGB signals, RGBin with the saturation signal S based on the RGB signals, RGBin. With this arrangement, by the effects similar to those in the above embodiment, the problems that arise in the first comparative example above do not occur. That is, in the RGB signals, RGBout, the reduction in the saturation in the portion where the sharpness is improved (high-frequency component) area, the reduction in the sharpness improvement effect depending on the magnitude of the hue or the saturation in the RGB signals (RGBin), etc. are avoided. Further, in the embodiment and the first and second modified examples above, by combining the value signal V with the high-frequency luminance signal Yhk after the gain control, the sharpness improvement process which strengthen the contrasting of an image is performed, whereas in the present modified example, it is possible to perform sharpness improvement process by which a color density is strengthen.

Figure 17:
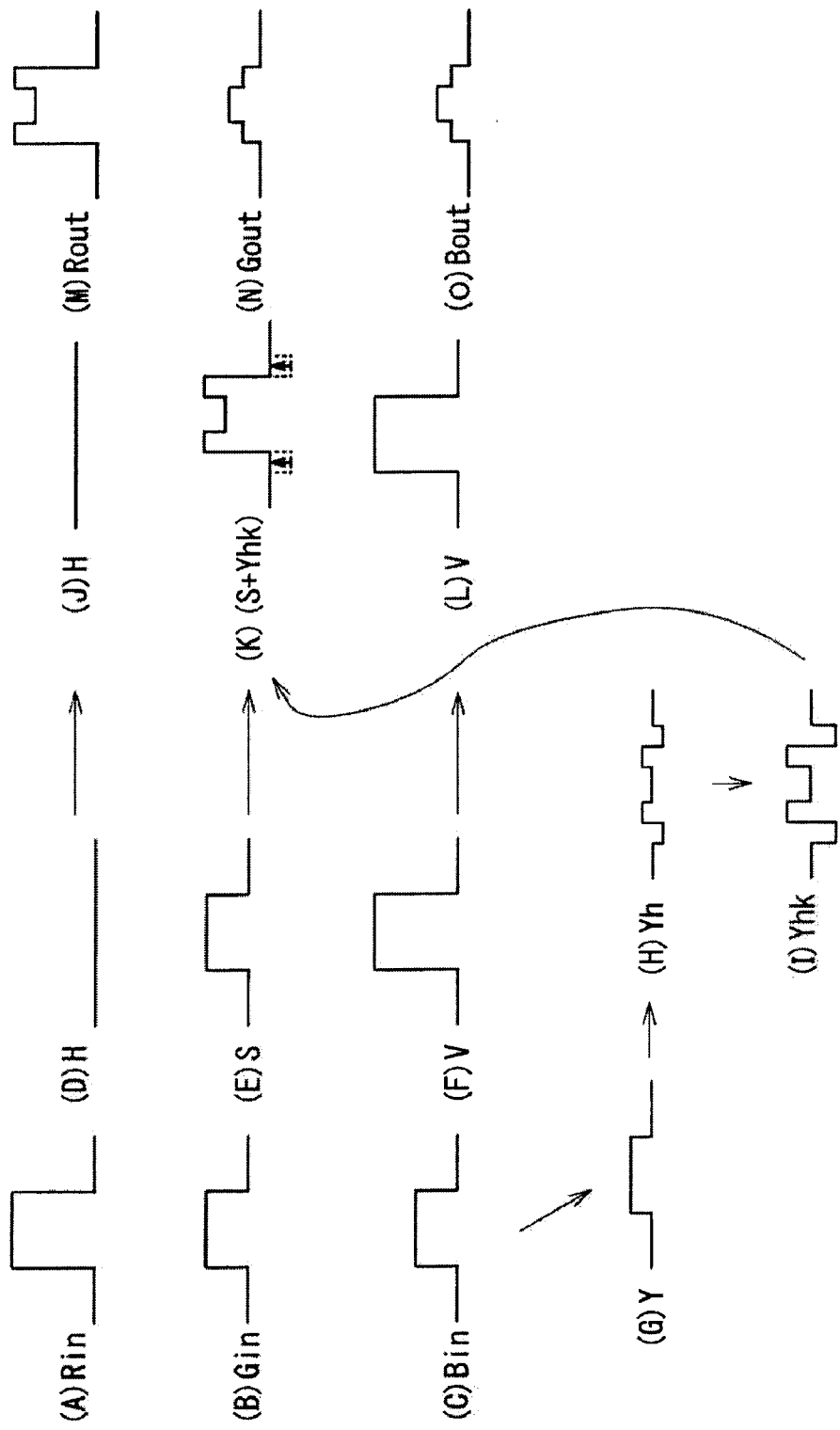
FIG. 17 is a timing waveform chart illustrating one example of the operation of the video signal processing device shown in FIG. 16.
Figure 18:
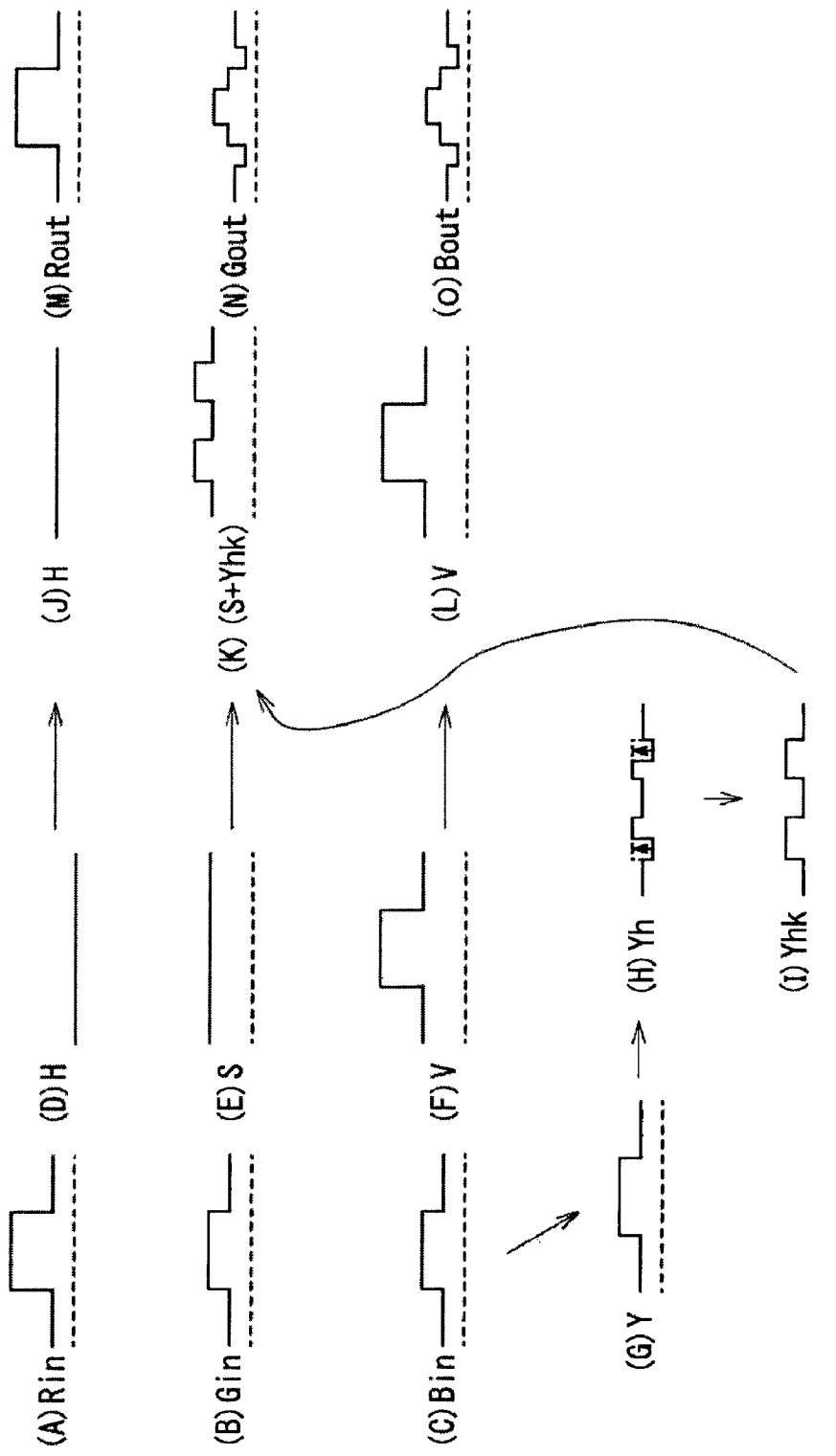
FIG. 18 is a timing waveform chart illustrating another example of the operation of the video signal processing device shown in FIG. 16.

FIGS. 17 and 18 each illustrate a timing waveform chart of each of the signals when performing a video signal process. The figures each show an example of the case where the saturation S of the RGB signals, RGBin is 50% (S=50%). In these figures, (A), (B), (C), (D), (E), (F), (G), (H), and (I) respectively denote: an R signal, Rin; a G signal, Gin; a B signal, Bin; a hue signal H; a saturation signal S; a value signal V; a luminance signal Y; a high-frequency luminance signal Yh; and a high-frequency luminance signal Yhk after gain control. Further, (J), (K), and (L) respectively denote: the hue signal H (the same as the signal shown in (D)); a combined saturation signal (S+Yhk); and the value signal V (the same as the signal shown in (F)). Yet further, (M), (N), and (O) respectively denote, among the RGB signals RGBout: an R signal, Rout; a G signal, Gout; and a B signal, Bout. Incidentally, here, as the high-frequency separating section 22, the horizontal-three-tap highpass filter circuit shown in FIG. 2 is used, while the gain control amount k in the gain controlling section 25 is set to 2 (k=2).

Firstly, in the example shown in FIG. 17, like the above embodiment, the sharpness in the R signal, Rout, the G signal, Gout, and the B signal, Bout is improved, in comparison to the original RGB signals RGBin ((M) to (O) in FIG. 17). Specifically, as can be seen from (J) to (L) in FIG. 17, since the high-frequency luminance signal Yhk after the gain control is combined with the saturation signal S without altering the hue signal H and the value signal V, the saturation in the edge portion is improved, and thus the sharpness of the color in the edge portion is improved. Incidentally, the dash lines and arrows in (K) of FIG. 17 show that the signal value of a negative(−) polarity is set to 0.

On the other hand, in the example shown in FIG. 18, initially, in the R signal, Rin, the G signal, Gin, and the B signal, Bin respectively shown in (A), (B), and (C), the signal values are offset by 50%, in comparison with the case shown in (A) to (C) of FIG. 17, and the signal values in these figures become half the values of FIG. 17. Incidentally, the dash line lines in FIG. 18 show the electric potentials where the signal value is 0. Even in such a case, basically, like the example shown in FIG. 17, since the high-frequency luminance signal Yhk after the gain control is combined with the saturation signal S without altering the hue signal H and the value signal V, the saturation in the edge portion is improved, resulting in the improvement in the sharpness of the color in the edge portion.

However, in the example of FIG. 18, as shown in (H) in the same figure, when performing gain control in the gain controlling section 25, the direction and the magnitude of the gain control are controlled individually for each polarity of the signal values (positive(+) polarity, negative(−) polarity). Due to this arrangement, it is possible to perform more accurate (finer) gain control in accordance with the polarity of the signal values, to achieve more appropriate improvement in the sharpness of color in the edge portion.

Next, referring to FIGS. 19 to 21, the video signal processing operation in the video signal processing unit 2C in the present modified example will be explained in comparison with the video signal processing operation in a video signal processing section 202 in the related art according to the comparative example (second comparative example).

Figure 19:
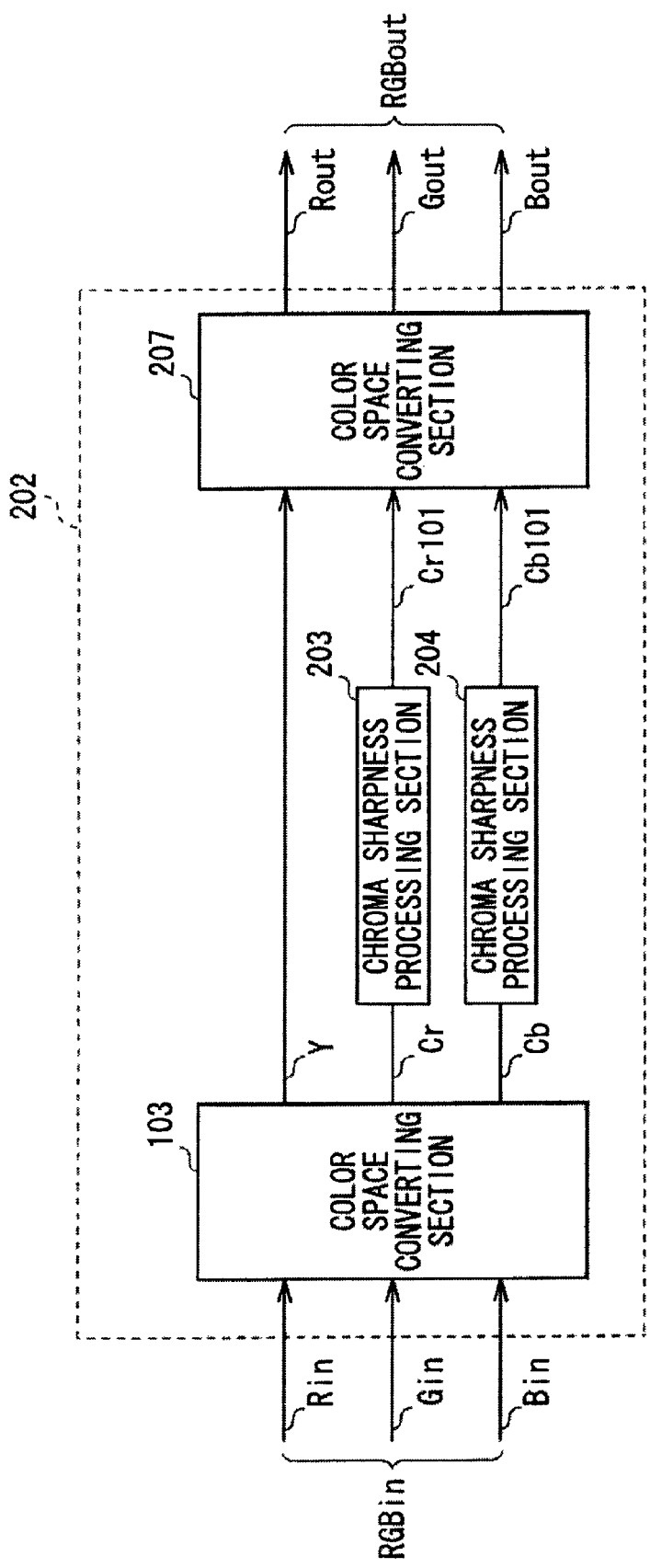
FIG. 19 is a block diagram illustrating a configuration of a video signal processing device according to a second comparative example.

FIG. 19 illustrates a block configuration of the video signal processing unit 202 according to the second comparative example. The video signal processing unit 202 includes the above-described color space converting section 103, two chroma sharpness processing sections 203 and 204, and a color space converting section 207.

The chroma sharpness processing section 203 performs a chroma sharpness process for a color difference signal Cr that is output from the color space converting section 103, thereby generating a color difference signal Cr101 after such a process. Specifically, as will be described in FIG. 20 below, by combining the color difference signal Cr and a sharpness correction signal Cr100 obtained from the high-frequency component of the color difference signal Cr, a color difference signal Cr101 is generated.

Likewise, the chroma sharpness processing section 204 performs a chroma sharpness process for the color difference signal Cb that is output from the color space converting section 103, thereby generating a color difference signal Cb101 after such a process. Specifically, as will be described in FIG. 20 below, by combining the color difference signal Cb and a sharpness correction signal Cb 100 obtained from the high-frequency component of the color difference signal Cb, a color difference signal Cb101 is generated.

The color space converting section 207 is configured to perform color space conversion for video signals (YCbCr signals) which are configured of the luminance signal Y output from the color space converting section 103, the color difference signal Cr101 output from the chroma sharpness processing section 203, and the color difference signal Cb101 output from the chroma sharpness processing section 204. With this arrangement, the RGB signals, RGB out which are the output video signals defined in RGB color space are to be generated. The color space converting section 207 is configured by a matrix circuit, etc. having a characteristic which is the inverse of the color space converting section 103.

Figure 20:
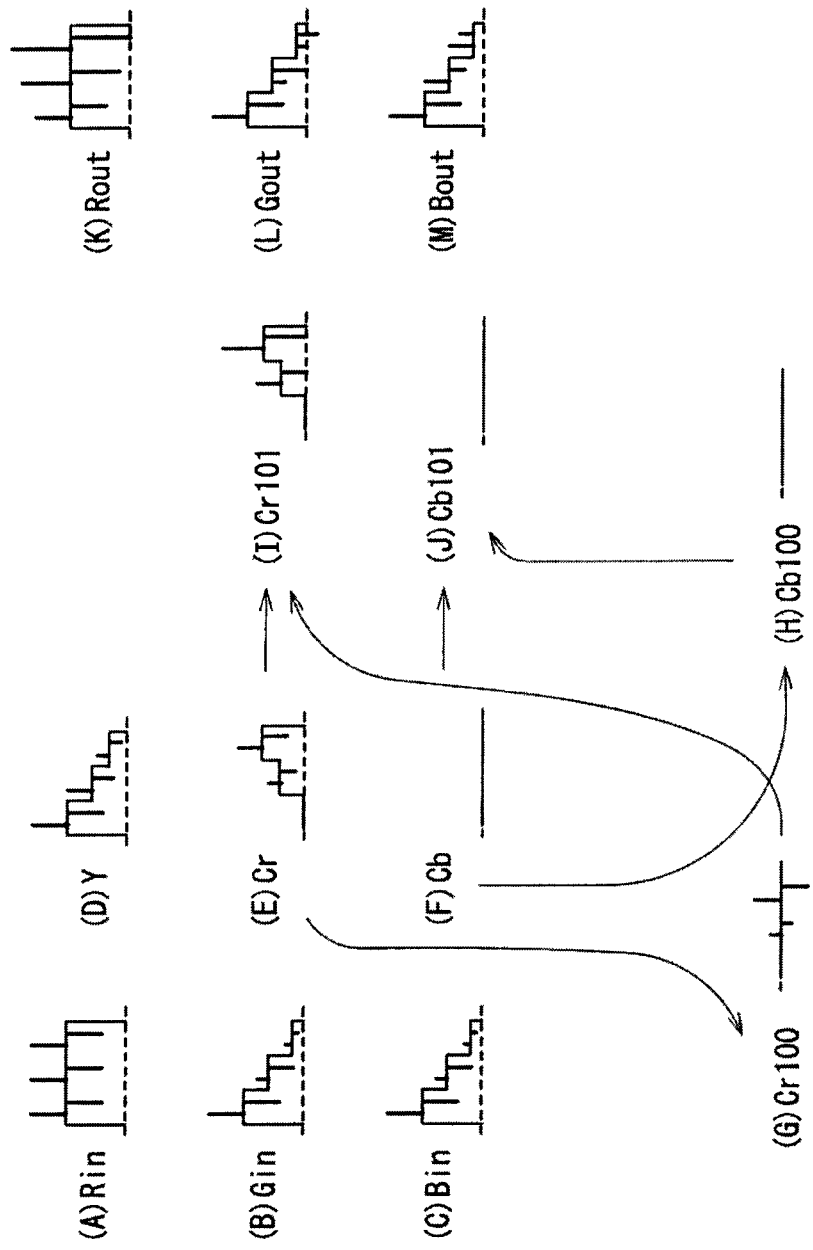
FIG. 20 is a timing waveform chart illustrating an operation example of the video signal processing device shown in FIG. 19.

FIG. 20 shows a timing waveform example of each of the signals when performing a video signal process in the video signal processing unit 202 according to the second comparative example. In this figure, (A), (B), (C), (D), (E), (F), (G), and (H) respectively denote: an R signal, Rin; a G signal, Gin; a B signal, Bin; a luminance signal Y; a color difference signal Cr; a color difference signal Cb; a color difference signal (sharpness correction signal) Cr100; and a color difference signal (sharpness correction signal) Cb100. Further, (I) and (J) respectively denote: a color difference signal Cr101 and a color difference signal Cb101. Yet further, (K), (L), and (M) respectively denote, among the RGB signals RGBout: an R signal, Rout; a G signal, Gout; and a B signal, Bout. Incidentally, in the R signal, Rin, G signal, Gin, and the B signal, Bin shown in (A) to (C), the saturations in the left portion, the central portion, and the right portion are, respectively, 0%, 50%, and 75%, while the pulsed high-frequency components are superimposed to each of the positive polarity side and the negative polarity side of the signal.

Figure 21:
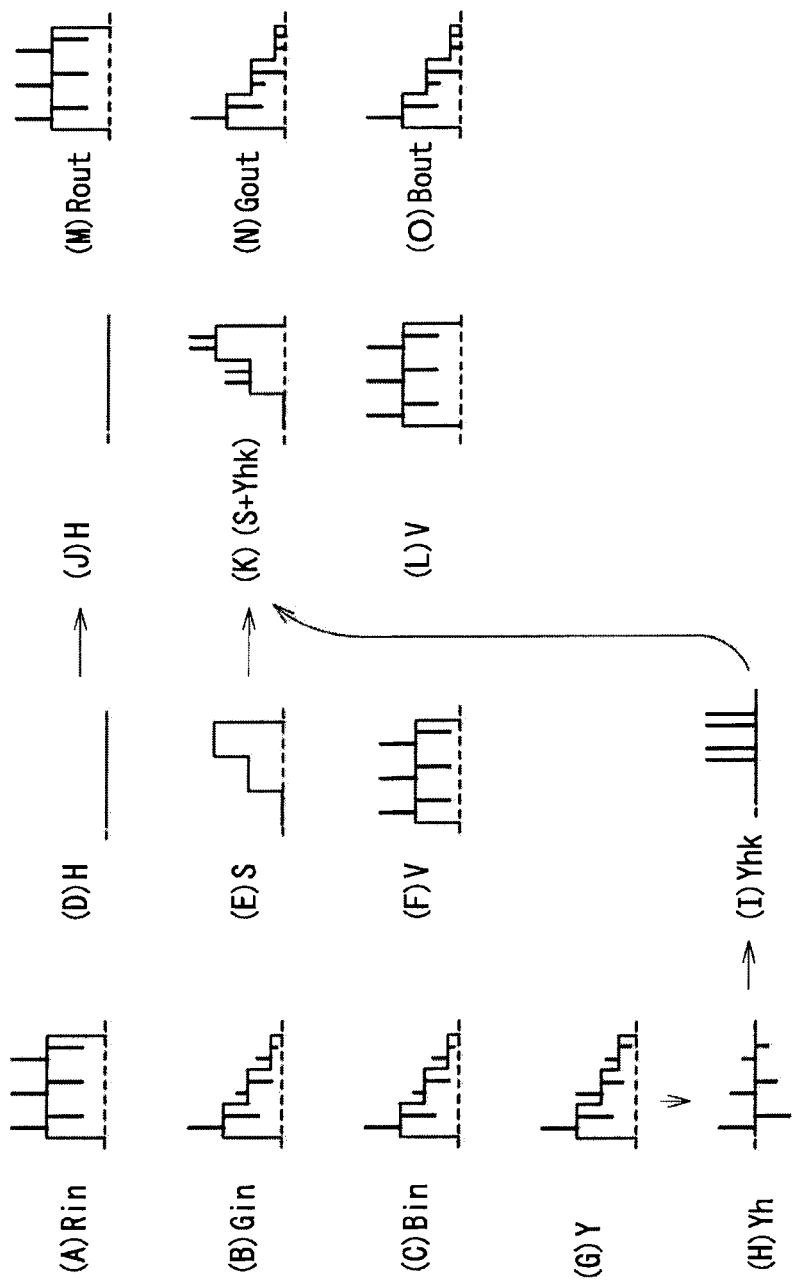
FIG. 21 is a timing waveform chart illustrating another example of the operation of the video signal processing device shown in FIG. 16.

FIG. 21 shows a timing waveform example of each of the signals when performing a video signal process in the video signal processing unit 2C according to the present modified example. In this figure, each signal shown in (A) to (O) are identical to each signal shown in (A) to (O) in FIGS. 17 and 18. Further, like the case of FIG. 20, in the R signal, Rin, G signal, Gin, B signal, Bin shown in (A) to (C), the saturations in the left portion, the central portion, and the right portion are, respectively, 0%, 50%, and 75%, while the pulsed high-frequency components are superimposed to each of the positive polarity side and the negative polarity side.

First of all, the second comparative example shown in FIG. 20, although the sharpness in the high-frequency portion of color is improved in the R signal, Rout, G signal, Gout, and the B signal, Bout shown in (K) to (M) in FIG. 20, alternation in the saturation and the hue occurs in accordance with the alternation in the luminance in the high-frequency component, which results in the occurrence of a plurality of side effects.

On the other hand, in the present modified example in FIG. 21, the correction amount (gain control amount) is determined individually for the correction in the saturation component and the correction in the value component, while no interinfluence occurs. Specifically, here, in the left portion of the wave (portion where S=0%) since it originally has achromatic color and there is no need to enhance the saturation, the value in the correction signal of the saturation shown in (I) (high-frequency luminance signal Yhk after the gain control) is 0%. In the central portion of the wave (portion where S=50%), in order to slightly enhance the saturation, the value of the correction signal of the saturation shown in (I) is 25%, and thus the saturation of this portion is improved from 50% to 75%. Further, also in the right portion of the wave (portion where S=75%), in order to enhance the saturation, the value of the correction signal of the saturation shown in (I) is 25%, and thus the saturation of this portion is improved from 75% to 100%. Accordingly, in the present modified example, as compared with the chroma sharpness process in the second comparative example, the improvement effect in the color sharpness is significant, and no above-described side effects occur.

Further, in the present modified example, unlike the RGB signals, RGBin as shown in FIG. 21 in which the frequency band is flat, in the case where the band restriction is performed in the color area of the RGB signals, RGBin, for example, the following is true. Specifically, in the process of transmitting the RGB signals, RGBin which are input video signals to the video signal processing unit 2C, the present modified example deals with the case where the frequency band restriction is performed for the color difference signals Cb and Cr among the YCbCr signals which are the basics for the RGB signals, RGBin.

Figure 22:
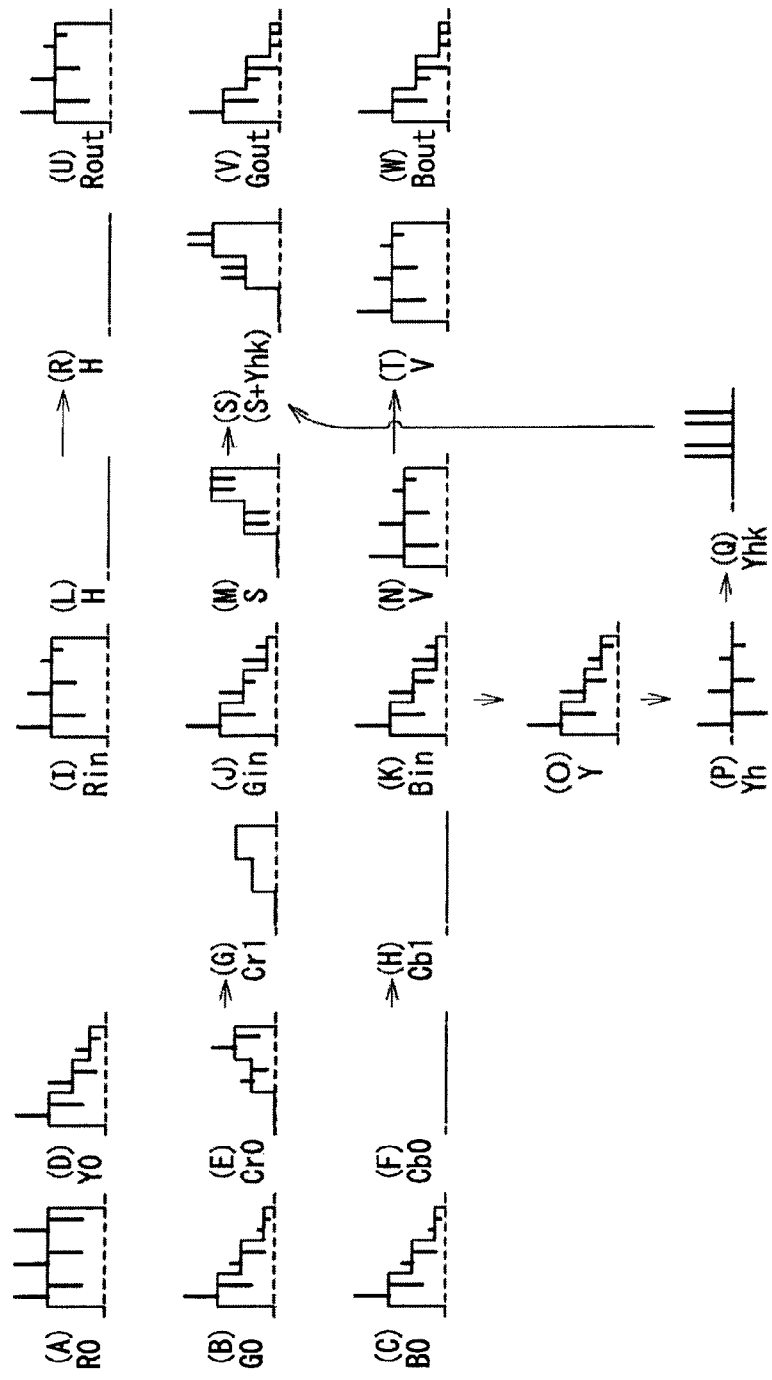
FIG. 22 is a timing waveform chart illustrating yet another example of the operation of the video signal processing device shown in FIG. 16.

FIG. 22 shows a timing waveform example of each of the signals when performing a video signal process in the case where such frequency band restriction is performed according to the present modified example. In the figure, (A), (B), and (C) respectively denote: original R signal, R0, G signal, G0, and B signal, B0. Also, (D), (E), and (F) respectively denote a luminance signal Y0, a color difference signal Cr0, and a color difference signal Cb0, obtained by the color conversion from such RGB signals. Further, (G) and (H) show the color difference signals Cr1 and Cb1 after the band restriction is performed for the color difference signals Cr0 and Cb0, and by performing the color conversion for the luminance signal Y0 and these color difference signals Cr1 and Cb1, the RGB signals, RGBin are to be obtained. Each signal shown in (I) to (W) is identical to that shown in FIG. 21 (A) to (O) described above.

In the example shown in FIG. 22, as shown in (G) in FIG. 22, since band restriction is performed in a transmission process, the high-frequency signal component becomes less for a low middle frequency signal component, resulting in the reduction in the saturation. In this case, in the correction signal of the saturation shown in (Q) (high-frequency luminance signal Yhk after the gain control), since the correction amount (gain control amount) is set in consideration of the saturation reduction by such band restriction, it is possible to improve the degree of the saturation reduction by the band restriction or avoid the same.

Accordingly, in the present modified example, in the video signal processing unit 2C, the saturation signal S based on the RGB signals, RGBin is combined with the high-frequency luminance signal Yhk after the gain control based on such RGB signals, RGBin, to thereby perform the sharpness improvement process for the color of an image. With this arrangement, like results resulting from the like effect shown in the above embodiment are obtained. That is, it is possible to more appropriately improve the sharpness of an image.

Further, since the gain control section 25 which performs gain control for the high-frequency luminance signal Yh is provided while in the combining section 26C, the saturation signal S and the high-luminance signal Yhk after the gain control are combined to thereby generate the combined saturation signal (S+Yhk), it is possible to perform the sharpness improvement process of the color for the desired portions in the desired areas of the hue, the saturation and the value.

Fourth Modified Example

Figure 23:
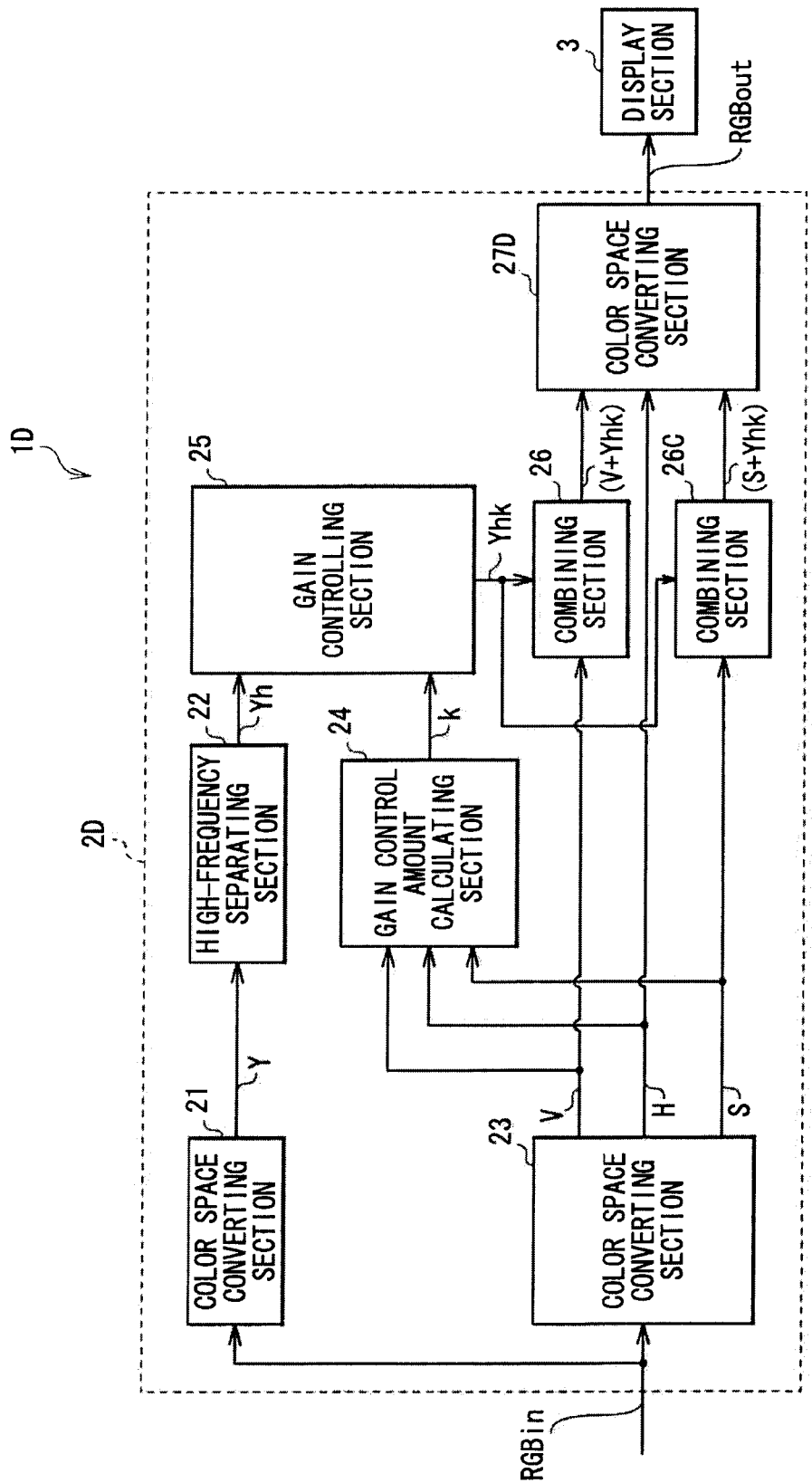
FIG. 23 is a block diagram illustrating the entire configuration of a display apparatus according to a fourth modified example of the embodiment of the present invention.

FIG. 23 is a block diagram of a display apparatus 1D according to the forth modified example. The display apparatus 1D includes a video signal processing unit 2D instead of the video signal processing unit 2 in the display apparatus 1 according to the above embodiment. That is, the display apparatus 1D deals with the combination of the art according to the above embodiment and the art of the third modified example, and thus deals with the case where the high-frequency luminance signal Yhk after the gain control is combined with, not only the value signal V, but also with the saturation signal S.

The video signal processing unit 2D includes: color space converting sections 21, 23, and 27D; the high-frequency separating sections 22; the gain control amount calculating section 24; the gain control section 25; and the combining section 26C. That is, the color space converting section 27D is provided, instead of the color space converting section 27C in the video signal processing 2C according to the third modified example.

The color space converting section 27D is configured to perform color space conversion for the video signals (HSV signals) which are configured of the hue signal H that is output from the color space converting section 23, the combined value signal (V+Yhk) that is output from the combining section 26, and the combined saturation signal (S+Yhk) that is output from the combining section 26C. With this arrangement, the RGB signals, RGBout, which are output video signals defined in RGB color space are generated. The color space converting section 27D is configured by a matrix circuit, etc. having a characteristic which is the inverse of the color space converting section 23. Incidentally, the color space converting section 27D corresponds to an example of the "second color space converting section" according to the embodiment of the present invention.

With this arrangement, also in this modified example, like results resulting from the like effect shown in the above embodiment and the above third modified example are obtained. That is, it is possible to more appropriately improve the sharpness of an image. Further, it is possible to perform both the sharpness improvement process which strengthen the contrasting of an image and the sharpness improvement process which strengthen the color density.

Fifth Modified Example

Figure 24:
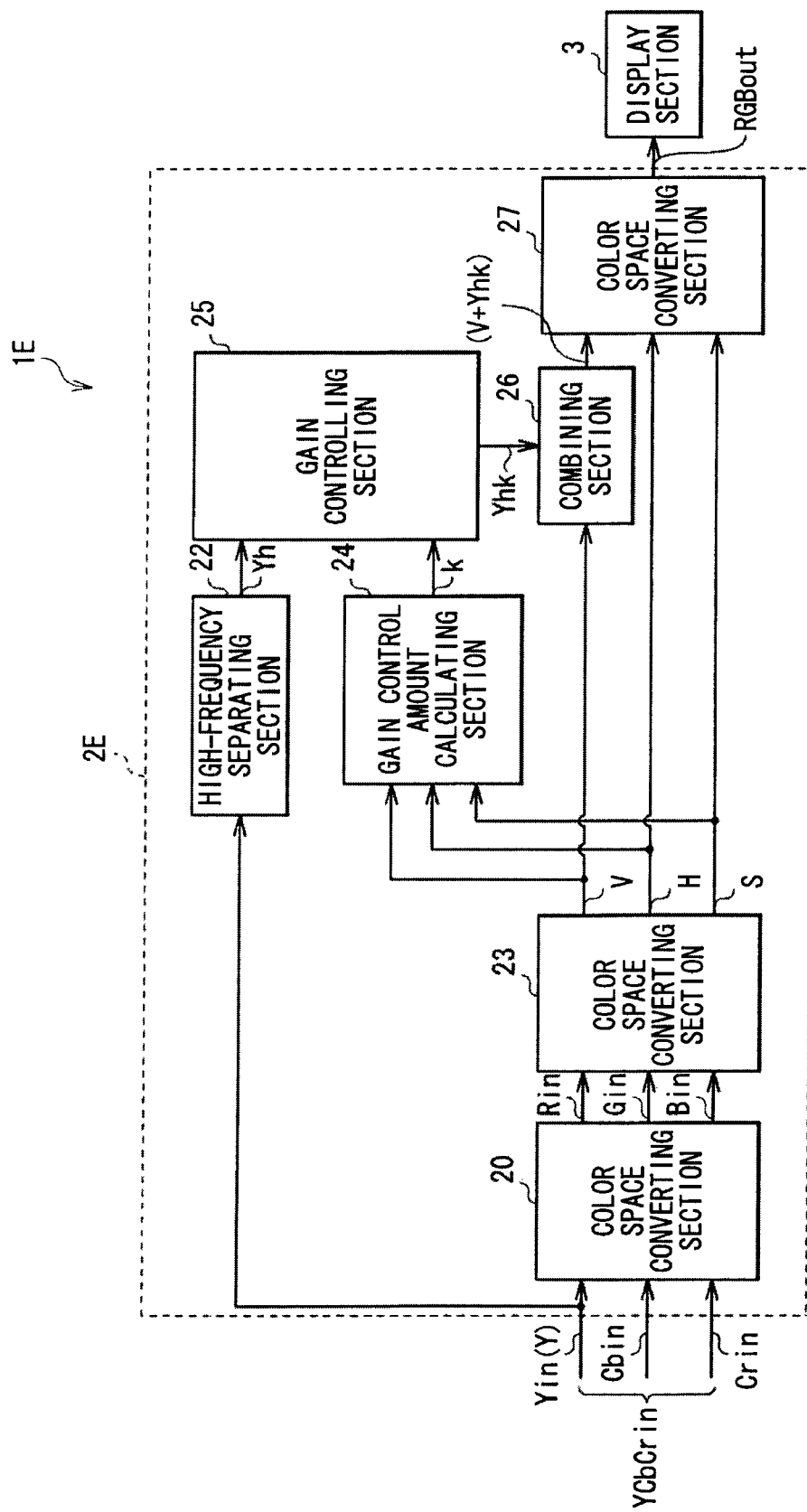
FIG. 24 is a block diagram illustrating the entire configuration of a display apparatus according to a fifth modified example of the embodiment of the present invention.

FIG. 24 shows a block diagram of a display apparatus 1E according to the fifth modified example. The display apparatus 1E includes a video signal processing unit 2E instead of the video signal processing unit 2 in the display apparatus 1 according to the above embodiment. That is, in the embodiment and the first to fourth modified examples as have been described above, the high-frequency luminance signal Yh is generated by separating the high-frequency component from the luminance signal Y obtained indirectly by performing color conversion for the RGB signals, RGBin, that are input video signals. In contrast, in the present modified example, the high-frequency luminance signal Yh is generated by separating the high-frequency component from the luminance signal Yin obtained directly from the input video signals, YCbCr signals, YCbCrin.

The video signal processing unit 2E includes: color space converting sections 20, 23, and 27; high-frequency separating sections 22; the gain control amount calculating section 24; the gain control section 25; and the combining section 26. That is, instead of the color space converting section 21 in the video signal processing unit 2, the color space converting section 20 is provided.

The color space converting section 20 is configured to perform color space conversion for the YCbCr signals, YCbCrin that are input from the outside, to thereby generate the RGB signals, RGBin, and then output the signals to the color space converting section 23. Incidentally, the luminance signal Yin among the YCbCr signals, YCbCrin that are input is also supplied to the high-frequency separating section 22. That is, in the high-frequency separating section 22 according to the present modified example, the high-frequency luminance signal Yh is generated by using the luminance signal Yin in the YCbCr signals, YCbCrin, that are input video signals. Incidentally, here, the color space converting section 20 and the color space converting section 23 correspond to an example of the "first color space converting section" according to the embodiment of the present invention.

With this arrangement, even in the case of the present modified example where the high-frequency luminance signal Yh is generated by separating the high-frequency component from the luminance signal Yin directly obtained from input video signals, YCbCr signal, YCbCrin, like results resulting from the like effect shown in the above embodiment are obtained. That is, it is possible to more appropriately improve the sharpness of an image.

Sixth Modified Example

Figure 25:
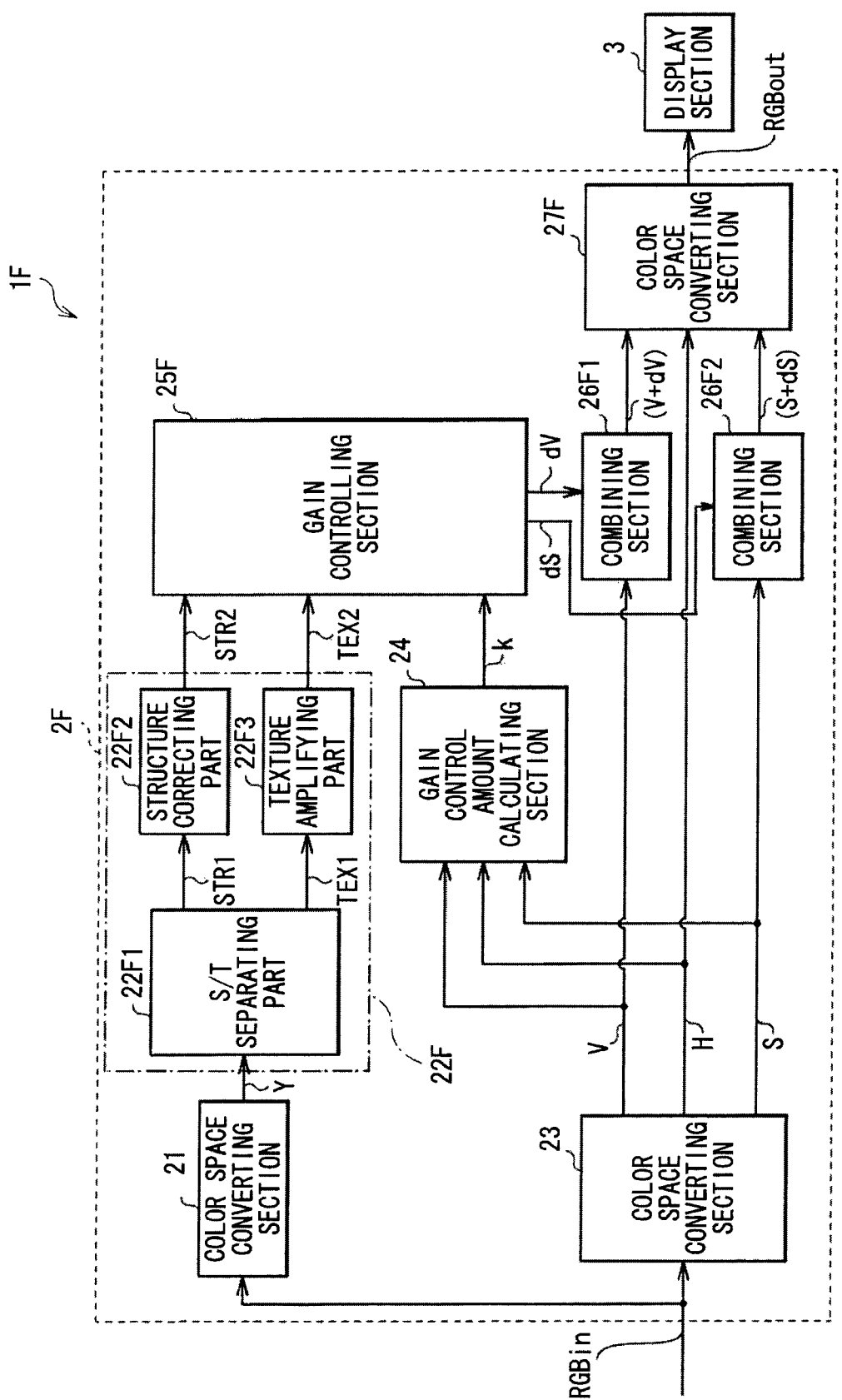
FIG. 25 is a block diagram illustrating the entire configuration of a display apparatus according to a sixth modified example of the embodiment of the present invention.

FIG. 25 shows a block configuration of a display apparatus 1F according to the sixth modified example. The display apparatus 1F includes a video signal processing unit 2F instead of the video signal processing unit 2 in the display apparatus 1 according to the above embodiment. That is, the sixth modified example deals with the case in which a structure component signal (signal of a component defining the contour of an image) and a texture component signal (signal of a component configuring the details of an image) that are obtained by separating them from the luminance signal Y are individually used as a high-frequency luminance signal. Incidentally, in the signal, the structure component corresponds to an average amplitude component including an edge (component representing the tendency of amplitude variation in the entire signal); and the texture component corresponds to a component having a small amplitude at a relatively high frequency other than the average amplitude component.

The video signal processing unit 2F includes: color space converting sections 21, 23, and 27F; a high-frequency separating section 22F; the gain control amount calculating section 24; a gain control section 25F; and two combining sections 26F1 and 26F2. That is, instead of the high-frequency separating section 22, the gain controlling section 25, the combining sections 26 and 26C, and the color space converting section 27D in the video signal processing unit 2D in the forth modified example, the high-frequency separating section 22F, the gain controlling section 25F, combining sections 26F1 and 26F2, and the color space converting section 27F are provided.

The high-frequency separating section 22F is configured to separate the luminance signal Y that is output from the color space converting section 21 into the high-frequency components thereof, i.e., a structure component signal STR2 and a texture component signal TEX2 for output. The high-frequency separating section 22F includes an S/T separating part 22F1, a structure correcting part 22F2, and a texture amplifying part 22F3.

Figure 26:
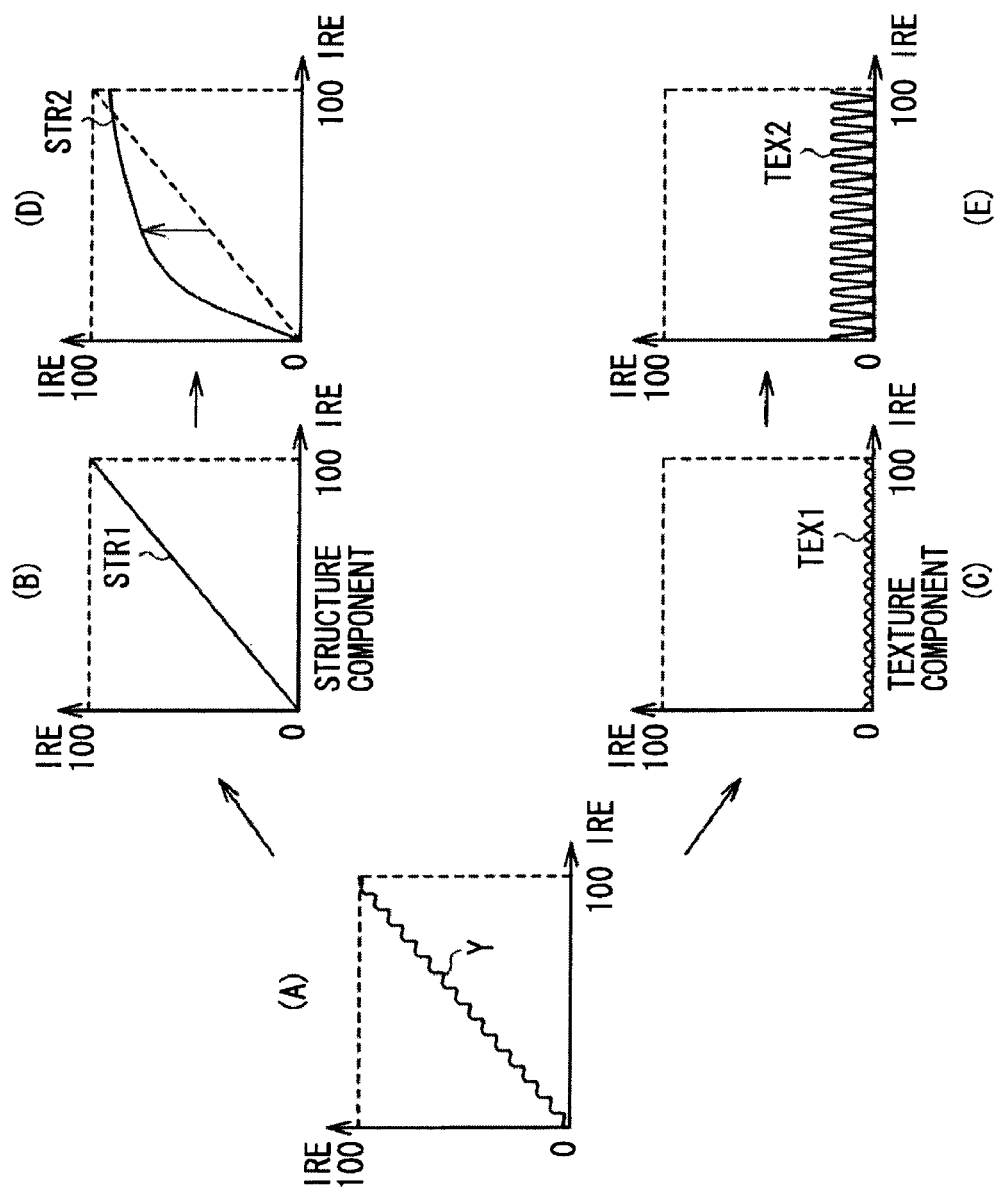
FIG. 26 is a characteristic diagram for illustrating an overview of the operation of a high frequency separating section shown in FIG. 25.

The S/T separating part 22F1 is configured to, as shown in (A) to (C) of FIG. 26, separate the luminance signal Y into the structure component signal STR1 and the texture component signal TEX1, which are the high-frequency components thereof, for output. The structure correcting part 22F2 is configured to, as shown in (D) of FIG. 26, perform correction of amplitude for the structure component signal STR1, so that the low-frequency side (black side) is uplifted while the high-frequency side (white side) is restricted, to thereby generate the structure component signal STR2. However, how to perform the correction is not limited thereto, but other methods may be used. On the other hand, the texture amplifying part 22F3 is configured to, as shown in, e.g., (E) of FIG. 26, perform amplification of the signal for the texture component signal TEX1, to thereby generate the texture component signal TEX2. Incidentally, the high-frequency separating section 22F corresponds to an example of the "first high-frequency separating section" of the embodiment of the present invention.

Figure 27:
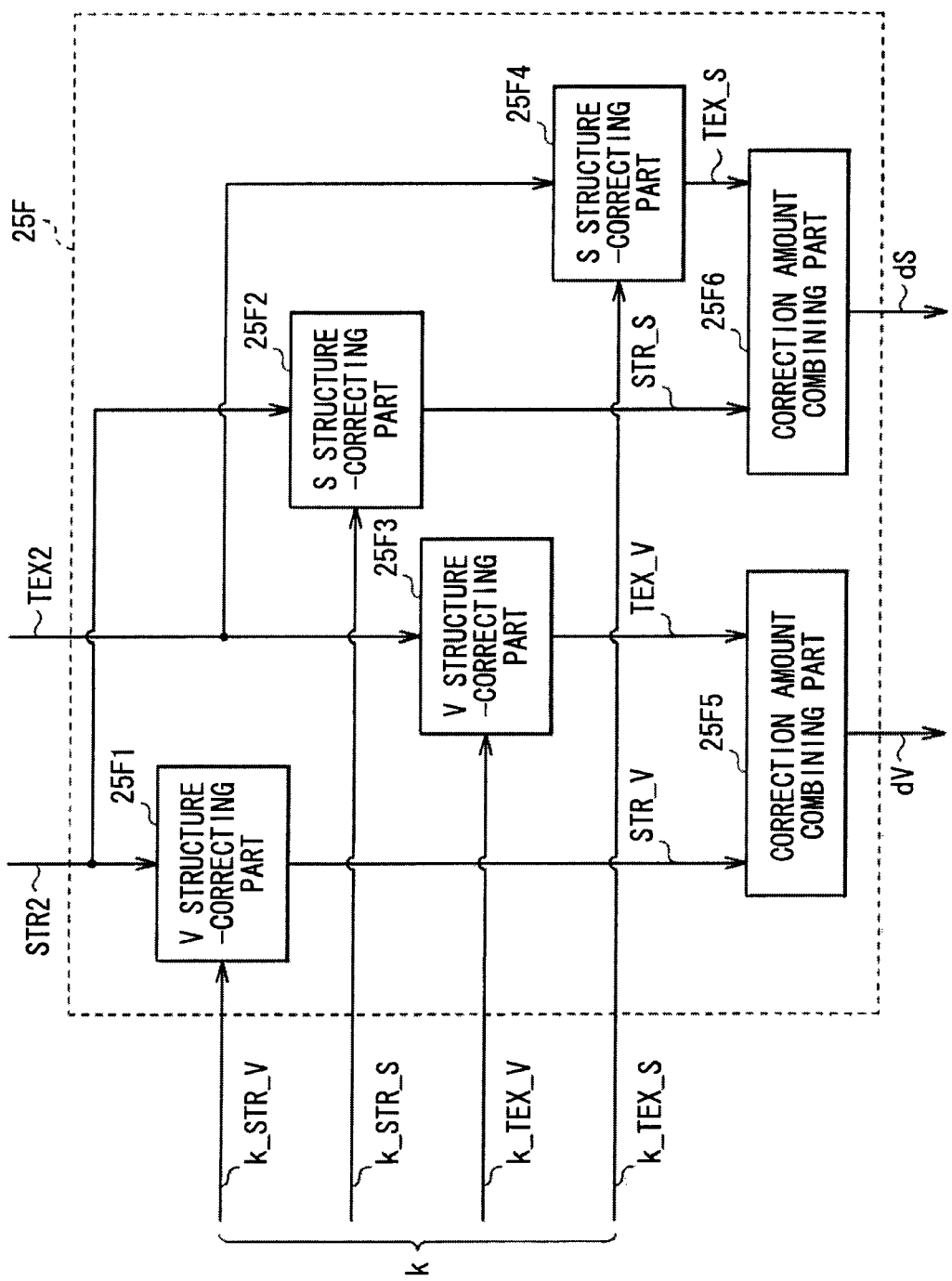
FIG. 27 is a block diagram illustrating the details of the configuration of a gain controlling section shown in FIG. 25.

The gain controlling section 25F is configured to perform gain control for the structure component signal STR2 and the texture component signal TEX2 that are output from the high-frequency separating section 22F, thereby individually outputting the correction amounts dV and dS corresponding to the high-frequency luminance signal after the gain control. The gain controlling section 25F includes, as shown in, e.g., FIG. 27, a V structure-correcting part 25F1, an S structure-correcting part 25F2, a V texture-correcting part 25F3, an S texture-correcting part 25F4, and two correction amount combining parts 25F5 and 25F6.

The V structure-correcting part 25F1 is configured to perform correction (perform gain control) for the structure component signal STR2 by using the correction coefficient k_STR_V, one of the gain control amount k, thereby generating the correction amount STR_V from the structure component for the value signal V. The S structure-correcting part 25F2 is configured to perform correction (perform gain control) for the structure component signal STR2 by using the correction coefficient k_STR_S, one of the gain control amount k, thereby generating the correction amount STR_S from the structure component for the saturation signal S.

The V texture-correcting part 25F3 is configured to perform correction (perform gain control) for the texture component signal TEX2 by using the correction coefficient k_TEX_V, one of the gain control amount k, thereby generating the correction amount TEX_V from the texture component for the value signal V. The S texture-correcting part 25F4 is configured to perform correction (perform gain control) for the texture component signal TEX2 by using the correction coefficient k_TEX_S, one of the gain control amount k, thereby generating the correction amount TEX_S from the texture component for the saturation signal S.

The correction amount combining part 25F5 is configured to combine the correction amount STR_V that is output from the V structure-correcting part 25F1 and the correction amount TEX_V that is output from the V texture-correcting part 25F3, thereby generating the correction amount dV for the value signal V. The correction amount combining part 25F6 is configured to combine the correction amount STR_S that is output from the S structure-correcting part 25F2 and the correction amount TEX_S that is output from the S texture-correcting part 25F4, to thereby generate the correction amount dS for the saturation signal S.

The combining section 26F1 is configured to perform a combining process based on the value signal V among the HSV signals that are output from the color space converting section 23 and the structure component signal STR2 and the texture component signal TEX2 (high-frequency luminance signals) that are output from the high-frequency separating section 22F, thereby generating the combined value signal. Specifically, here, by combining the value signal V and the correction amount dV (high-frequency luminance signal after the gain control) that is output from the gain controlling section 25F, the value signal (V+dV) is generated.

The combining section 26F2 is configured to perform a combining process based on the saturation signal S among the HSV signals that are output from the color space converting section 23 and the structure component signal STR2 and the texture component signal TEX2 (high-frequency luminance signal) that are output from the high-frequency separating section 22F, to thereby generate the combined saturation signal. Specifically, here, by combining the saturation signal S and the correction amount dS (high-frequency luminance signal after the gain control) that is output from the gain controlling section 25F, the combined saturation signal (S+dS) is generated.

The color space converting section 27F is configured to perform color space conversion for the video signals (HSV signals) which are configured of the hue signal H that is output from the color space converting section 23, the combined value signal (V+dV) that is output from the combining section 26F1, and the combined saturation signal (S+dS) that is output from the combining section 26F2. With this arrangement, the RGB signals, RGBout, which are output video signals defined in RGB color space are generated. This color space converting section 27F is configured by a matrix circuit, etc. having a characteristic which is the inverse of the color space converting section 23. Incidentally, the color space converting section 27F corresponds to an example of the "second color space converting section" according to the embodiment of the present invention.

Figure 28:
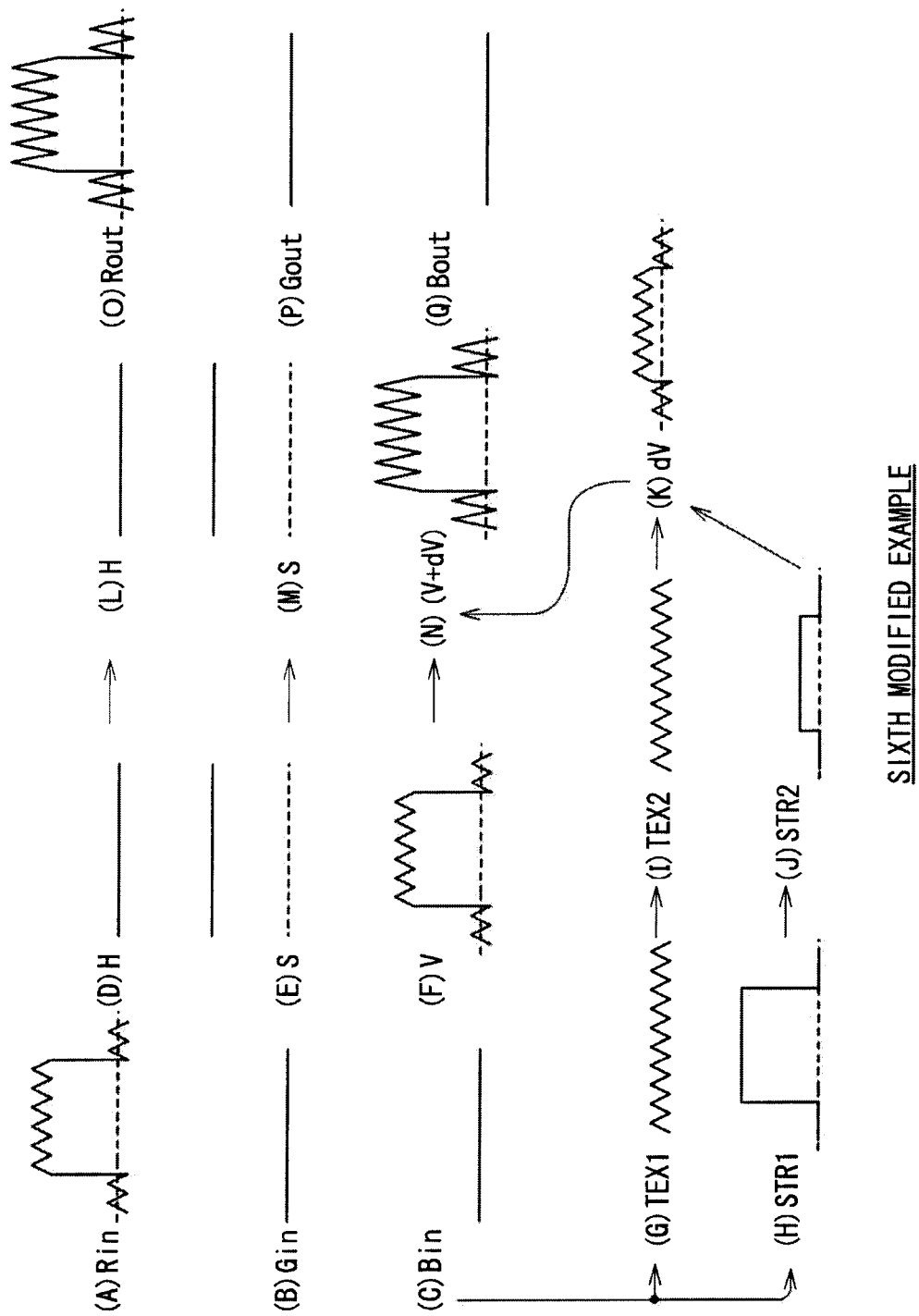
FIG. 28 is a timing waveform chart illustrating an operation example of a video signal processing unit shown in FIG. 25.

FIG. 28 shows a timing waveform example of each of the signals when performing a video signal process in the video signal processing unit 2F. In this figure, (A), (B), (C), (D), (E), and (F) respectively denote: an R signal, Rin; a G signal, Gin; a B signal, Bin; a hue signal H; a saturation signal S; and a value signal V. Further, (G), (H), (I), (J), and (K) respectively denote: a texture component signal TEX1; a structure component signal STR1; a texture component signal TEX2; a structure component signal STR2; and a correction amount dV. Further, (L), (M), and (N) denote: the hue signal H (the same signal as shown in (D)); the saturation signal S (the same signal as shown in (E)); and a combined value signal (V+dV). The (O), (P), (Q) respectively denote, among the RGB signals, RGBout: an R signal, Rout; a G signal, Gout; and a B signal, Bout. Incidentally, here, the RGB signals, RGBin represent, in a window signal in which red is 100%, an image containing narrow longitudinal lines. Further, here, the example of FIG. 28 deals with the case where only the combined value signal (V+dV) is generated, but not the case where both the combined value signal (V+dV) and the combined saturation signal (S+dS) are generated.

In the example shown in FIG. 28, in the RGB signals, RGBout shown in (O) to (Q), the sharpness and contrast are increased while there is no reduction in saturation for the RGB signals, RGBin shown in (A) to (C), and thus the RGBout is a signal in which the red is 100%.

Accordingly, even in the case of the present modified example, where the structure component signal and the texture component signal obtained by separating the components from the luminance signal Y are used as high-frequency luminance signals, like results resulting from the like effect shown in the above embodiment are obtained. That is, it is possible to more appropriately improve the sharpness of an image.

Seventh Modified Example

Figure 29:
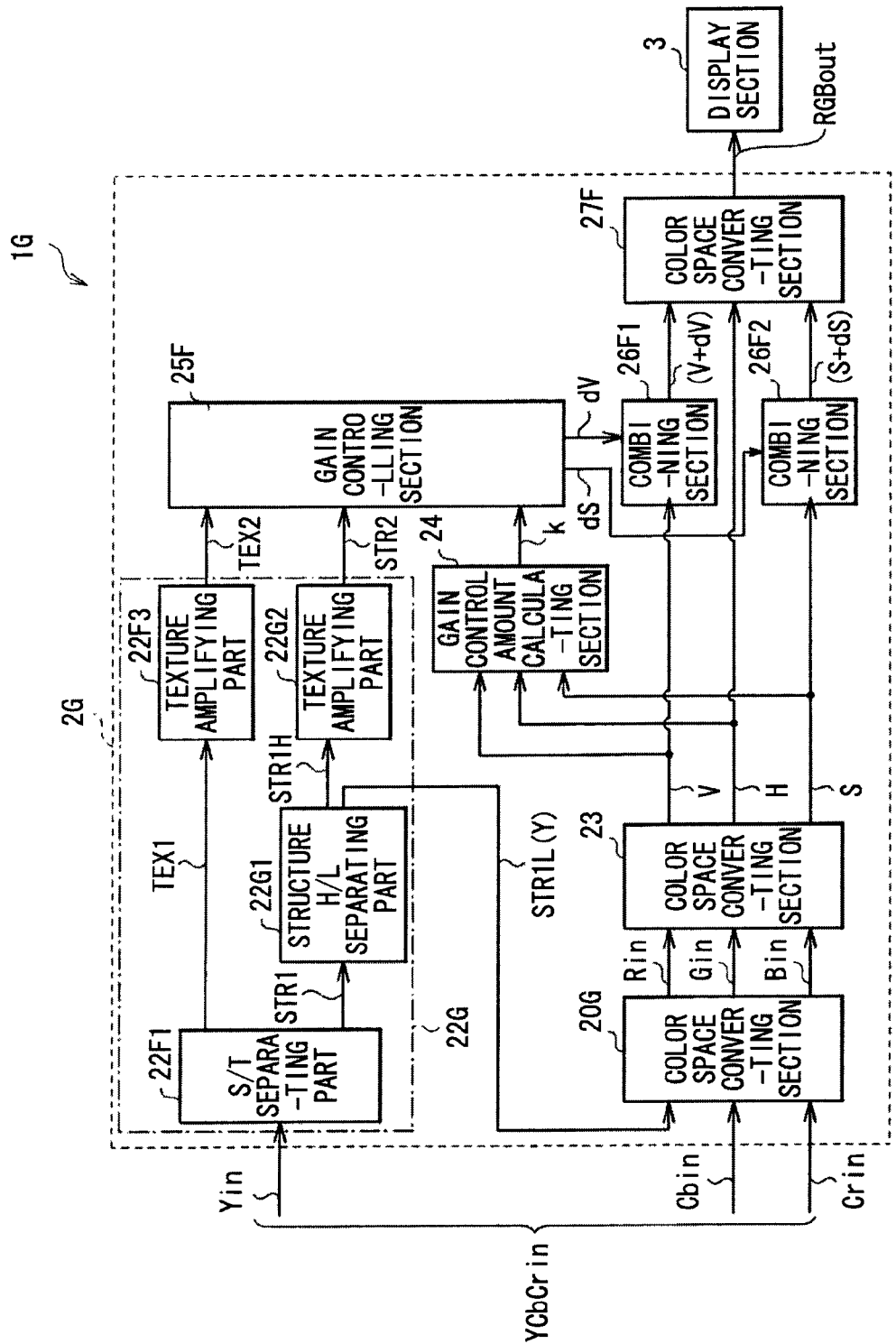
FIG. 29 is a block diagram illustrating the entire configuration of a display apparatus according to a seventh modified example of the embodiment of the present invention.

FIG. 29 is a block configuration of a display apparatus 1G according to a seventh modified example of the embodiment of the present invention. The display apparatus 1G includes a video signal processing unit 2G instead of the video signal processing unit 2 in the display apparatus 1 according to the above embodiment. That is, the display apparatus 1G deals with the combination of the art according to arts of the fifth and sixth modified examples, and is configured to generate the structure component signal STR2 and the texture component signal TEX2 corresponding to the high-frequency luminance signal, based on the luminance single Yin directly obtained from the YCbCr signals, YCbCrin, which are input video signals.

The video signal processing unit 2G includes: color space converting sections 20G, 23, and 27F; a high-frequency separating section 22G; the gain control amount calculating section 24; the gain controlling section 25F; and the two combining sections 26F1 and 26F2. That is, the video signal processing unit 2G includes the color space converting section 20G and the high-frequency separating section 22G instead of the color space converting section 21 and the high-frequency separating section 22F in the video signal processing unit 2F in the sixth modified example.

The high-frequency separating section 22G is configured to separate the luminance signal Yin among the YCbCr signals, YCbCrin, into the structure component signal STR2 and the texture component signal TEX2, which are high-frequency components thereof, for output. The high-frequency separating section 22G includes the S/T separating part 22F1, the texture amplifying part 22F3, (which are described above) a structure H/L separating part 22G1, and a structure correcting part 22G2. Incidentally, the high-frequency separating section 22G corresponds to an example of the "first high-frequency separating section" according to the embodiment of the present invention.

The structure H/L separating part 22G1 is configured to further separate the structure component signal STR1 that is output from the S/T separating part 22F1 into a structure high-frequency component signal STR1H and a structure low-frequency component signal STR1L to output the same.

The structure correcting part 22G2 is configured to perform correction similar to that performed in the above-described structure correcting part 22F2, for the structure high-frequency component signal STR1H that is output from the structure H/L separating part 22G1, and then generate the structure component signal STR2.

The color space converting section 20G is configured to perform color space conversion for the video signals which are configured of color difference signals Cbin and Crin among the YCbCr signals, YCbCrin and the structure low-frequency component signal STR1L (corresponding to the luminance signal Y) that is output from the structure H/L separating part 22G1. With this arrangement, the RGB signals, RGBin are generated and then are output to the color space converting section 23. Incidentally, here, the color space converting section 20G and the color space converting section 23 correspond to an example of the "first color space converting section" according to an embodiment of the present invention.

Figure 30:
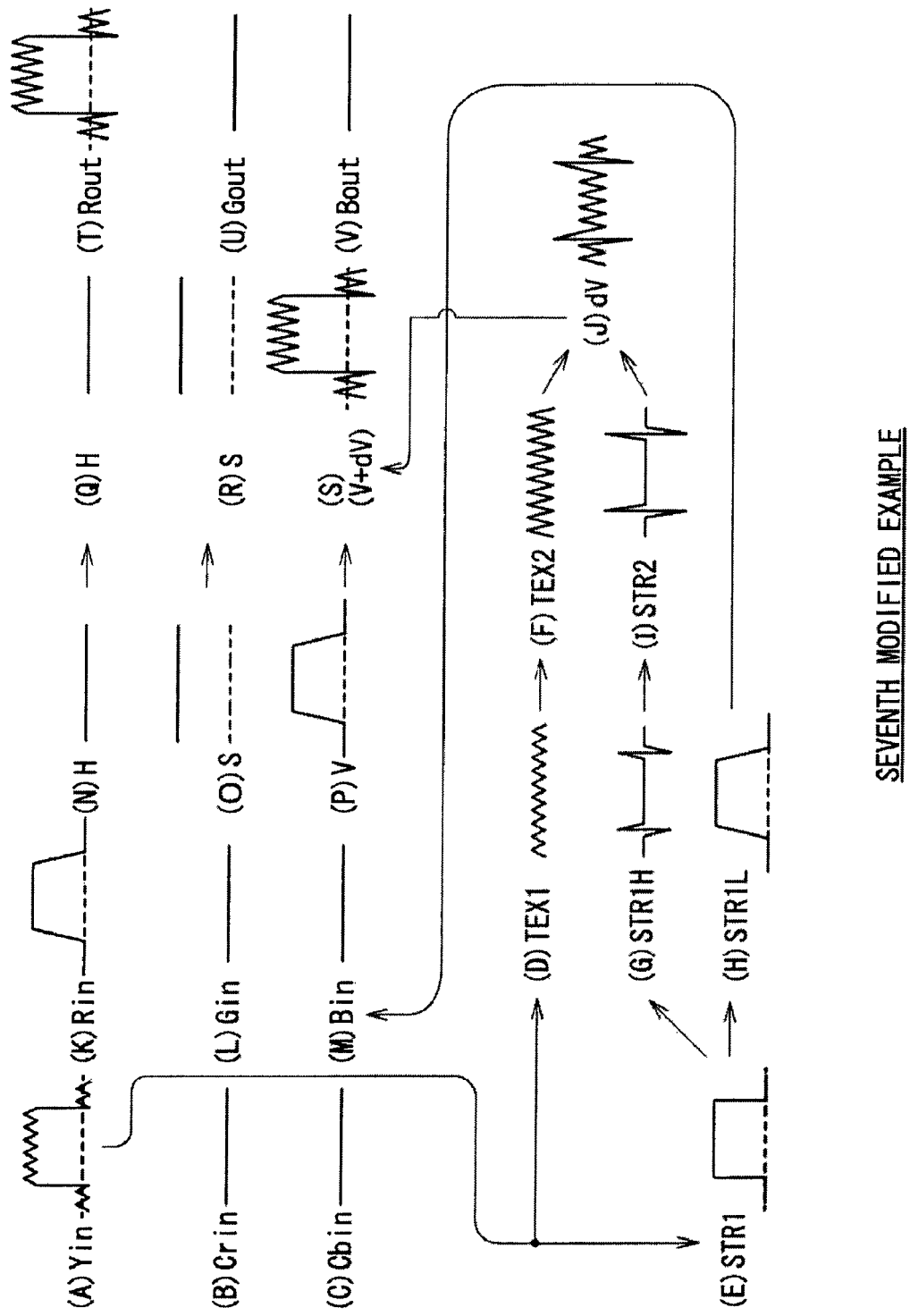
FIG. 30 is a timing waveform chart illustrating an operation example of the video signal processing device shown in FIG. 29.

FIG. 30 shows a timing waveform example of each of the signals when performing a video signal process in the video signal processing unit 2G. In this figure, (A), (B), and (C) respectively denote a luminance signal Yin, a color difference signal Crin, and a color difference signal Cbin. Also, (D), (E), (F), (G), (H), (I), and (J) respectively denote: a texture component signal TEX1; a structure component signal STR1; a texture component signal TEX2; a structure high-frequency component signal STR1H; a structure low-frequency component signal STR1L; a structure component signal STR2; and a correction amount dV. Further, (K), (L), (M), (N), (O), and (P) respectively denote: an R signal, Rin; a G signal, Gin; a B signal, Bin; a hue signal H; a saturation signal S; and a value signal V. Further, (Q), (R), and (S) respectively denote the hue signal H (the same signal as shown in (N)), the saturation signal S (the same signal as shown in (O)), and a combined value signal (V+dV). (T), (U), and (V) respectively denote, among the RGB signals, RGBout: an R signal, Rout; G signal, Gout; and a B signal, Bout. Incidentally, here, the YCbCr signals, YCbCrin represent, in a window signal where red is 100%, an image containing narrow longitudinal lines. Further, here, the example of FIG. 30 also deals with the case where only the combined value signal (V+dV) is generated, but not the case where both the combined value signal (V+dV) and the combined saturation signal (S+dS) are generated.

Also in the example shown in FIG. 30, similarly to the example in the described sixth modified example in FIG. 28, in the RGB signals, RGBout shown in (T) to (V), the sharpness and contrast are increased while there is no reduction in saturation for the YCbCr signals, YCbCrin shown in (A) to (C), and thus the RGBout is a signal in which the red is 100%.

Accordingly, even in the case of the present modified example where the structure component signal STR2 and the texture component signal TEX2 corresponding to the high-frequency luminance signal are generated based on the luminance signal Yin directly obtained from the YCbCr signals, YCbCrin which are input video signals, like results resulting from the like effect shown in the above fifth and sixth modified examples are obtained. Therefore, it is possible to more appropriately improve the sharpness of an image.

Other Modified Examples

Although the invention has been described referring to the embodiment as well as modified examples, the invention is not limited to the embodiment, etc. but may be variously modified.

For example, although in the embodiment, etc. described above, the case where gain control amount is calculated based on the hue signal H, the saturation signal S, and the value signal V in the gain control amount calculating section has been described, the invention is not limited thereto. That is, the gain control amount may be calculated based on at least one of the hue signal H, the saturation signal S, and the value signal V, in the gain control amount calculating section.

Further, although in the embodiment, etc. described above, the case where the gain control amount calculating section and the gain controlling section are provided within the video signal processing unit has been described, the gain control amount calculating section and the gain controlling section may not be provided within the video signal processing unit, depending on the case. That is, for example, the gain control amount may be set as a fixed value or the gain control amount may be controlled according to the user's operation.

Further, each method of the video signal process described in the embodiments, etc. may be used with any combination.

In addition, the video signal processing device according to the embodiment of the present invention is not limited to be used for the display apparatus as has been described in the above embodiment, etc., but may be applied to other apparatuses other than the display apparatus (e.g., a video signal recording apparatuses, a video signal recording reproduction apparatuses, etc.).

The present application contains subject matters related to those disclosed in Japanese Priority Patent Applications JP 2009-96358 and JP 2009-198677, filed in the Japan Patent Office on Apr. 10, 2009 and Aug. 28, 2009, respectively, the entire content of which is hereby incorporated by references.

It should be understood by those skilled in the art that various modifications, combinations, sub-combinations and alterations may occur depending on design requirements and other factors insofar as they are within the scope of the appended claims or the equivalents thereof.

What is claimed is:
1. A video signal processing device comprising:
  a first color space converting section performing color space conversion on an input video signal, thereby generating a converted video signal configured of a hue signal (H), a saturation signal (S) and a value signal (V) defined in HSV color space;

a first high-frequency separating section separating a high-frequency component from a luminance signal (Y) which is directly or indirectly obtained from the input video signal, thereby generating one or more high-frequency luminance signals, wherein the first high-frequency separating section separates a structure component signal which defines the contour of an image and a texture component signal which configures the details of an image, from the luminance signal, and then outputs the structure component signal or the texture component signal or each of both thereof, as the high-frequency luminance signal;

a combining section performing a combining process based on either the value signal or the saturation signal, or both thereof, and the high-frequency luminance signal, thereby generating either a combined value signal or a combined saturation signal, or both thereof; and a second color space converting section performing color space conversion on a video signal, which is configured of the hue signal, the saturation signal or the combined saturation signal, and the value signal or the combined value signal, the video signal including either the combined saturation signal or the combined value signal, or both thereof, thereby generating an output video signal defined in RGB color space.

2. The video signal processing device according to claim 1, further comprising a gain control section performing gain control on at least the high-frequency luminance signal, wherein the combining section performs a combining process based on either the value signal or the saturation signal, or both thereof, and a gain-controlled high-frequency luminance signal, thereby generating either a combined value signal or a combined saturation signal, or both thereof.

3. The video signal processing device according to claim 2, further comprising a calculating section performing calculation of a gain control factor to be used for the gain control, the calculation being based on one or more selected from a group of the hue signal, the saturation signal, and the value signal.

4. The video signal processing device according to claim 1, further comprising a second high-frequency separating section separating a high-frequency component from the value signal to generate a high-frequency value signal, wherein the combining section performs a combining process based on either the value signal or the saturation signal, or both thereof, and a combined signal obtained based on the high-frequency luminance signal and the high-frequency value signal, thereby generating either a combined value signal or a combined saturation signal, or both thereof.

5. The video signal processing device according to claim 4, wherein the combining section performs a combining process based on either the value signal or the saturation signal, or both thereof, and a combined signal obtained based on a gain-controlled high-frequency luminance signal and a gain-controlled high-frequency value signal, thereby generating either a combined value signal or a combined saturation signal, or both thereof.

6. The video signal processing device according to claim 4, wherein the combined signal is obtained through a predetermined weighing operation based on the high-frequency luminance signal and the high-frequency value signal.

7. The video signal processing device according to claim 1, wherein the input video signal is configured of a luminance signal (Y) and color difference signals (Cb, Cr) defined in YCbCr color space, the first high-frequency separating section separates the texture component signal and the structure component signal from the luminance signal in the input video signal, further separates a structure high-frequency component signal and a structure low frequency component signal from the structure component signal, and then outputs the structure component signal or the texture component signal or both thereof, as the high-frequency luminance signal.

8. The video signal processing device according to claim 7, wherein the first color space converting section performs the color space conversion on an video signal which is configured of the color difference signals in the input video signals and the structure low-frequency component signal outputted from the first high-frequency separating section, thereby generating the converted video signal.

9. The video signal processing device according to claim 1, wherein the first color space converting section performs the color space conversion on the input video signal defined in RGB color space, thereby to generate the converted video signal, and the video signal processing device further comprises a third color space converting section which performs color space conversion on the input video signal to generates the luminance signal.

10. The video signal processing device according to claim 1, wherein the first color space converting section performs the color space conversion on the input video signal configured of a luminance signal (Y) and color difference signals (Cb, Cr) defined in YCbCr color space, thereby generating the converted mage signals, and the first high-frequency separating section generates the high-frequency luminance signal by using the luminance signal in the input video signal.

11. A display apparatus comprising:

a first color space converting section performing color space conversion on an input video signal, thereby generating a converted video signal configured of a hue signal (H), a saturation signal (S) and a value signal (V) defined in HSV color space;

a first high-frequency separating section separating a high-frequency component from a luminance signal (Y) which is directly or indirectly obtained from the input video signal, thereby generating one or more high-frequency luminance signals, wherein the first high-frequency separating section separates a structure component signal which defines the contour of an image and a texture component signal which configures the details of an image, from the luminance signal, and then outputs the structure component signal or the texture component signal or each of both thereof, as the high-frequency luminance signal;

a combining section performing a combining process based on either the value signal or the saturation signal, or both thereof, and the high-frequency luminance signal, thereby generating either a combined value signal or a combined saturation signal, or both thereof; and a second color space converting section performing color space conversion on a video signal, which is configured of the hue signal, the saturation signal or the combined saturation signal, and the value signal or the combined value signal, the video signal including either the combined saturation signal or the combined value signal, or both thereof, thereby generating an output video signal defined in RGB color space; and a display section displaying an image based on the output video signal.

* * * * *